United States Patent
Ujino

(10) Patent No.: US 7,813,872 B2
(45) Date of Patent: Oct. 12, 2010

(54) IMAGE PROCESSING SYSTEM, METHOD AND APPARATUS FOR CORRELATING POSITION DATA WITH IMAGE DATA

(75) Inventor: Koji Ujino, Wakayama (JP)

(73) Assignee: Noritsu Kuki, Co., Ltd., Wakayama-shi (JP)

( * ) Notice: Subject to any disclaimer, the term of this patent is extended or adjusted under 35 U.S.C. 154(b) by 0 days.

(21) Appl. No.: 12/578,971

(22) Filed: Oct. 14, 2009

(65) Prior Publication Data

US 2010/0094546 A1 Apr. 15, 2010

Related U.S. Application Data

(63) Continuation of application No. 11/133,919, filed on May 20, 2005, now Pat. No. 7,627,420.

(30) Foreign Application Priority Data

| May 20, 2004 | (JP) | ............................. 2004-150364 |
| Sep. 17, 2004 | (JP) | ............................. 2004-271811 |
| Dec. 24, 2004 | (JP) | ............................. 2004-373445 |

(51) Int. Cl.
  *G01C 21/30* (2006.01)
(52) U.S. Cl. .................. 701/200; 701/208; 701/209; 701/211; 340/995.1
(58) Field of Classification Search ......... 701/200–213; 340/994–995.18
  See application file for complete search history.

(56) References Cited

U.S. PATENT DOCUMENTS

| 4,974,170 A | 11/1990 | Bouve et al. |
| 7,383,123 B2 | 6/2008 | Park |
| 7,487,114 B2 | 2/2009 | Florance et al. |

FOREIGN PATENT DOCUMENTS

| JP | 09-179491 | 7/1997 |
| JP | 11-275494 A | 10/1999 |

(Continued)

OTHER PUBLICATIONS

Abstract of Office Action issued May 8, 2009 for Japanese Patent Application No. 2004-373445.

*Primary Examiner*—Richard M. Camby
(74) *Attorney, Agent, or Firm*—Fulbright & Jaworski LLP

(57) ABSTRACT

A navigation system includes a processing unit for generating route data relating to a route along which a vehicle has actually traveled, from position data acquired by a position acquiring unit, an image data acquiring section for acquiring image data, a first storage section for storing the image data acquired by the image acquiring unit according to groups of respective destinations, and a second storage section for storing the route data generated by the processing unit. A link data generating section is provided for correlating the respective destinations with the respective route data via link data. An outputting unit is configured to extract a group linked to a destination by the link data in response to a manual designation of a route data stored in the second storage section or to a manual or automatic designation of a designation included in that route data and then to output the image data included in that group from the first storage section to an outputting section.

6 Claims, 30 Drawing Sheets

FOREIGN PATENT DOCUMENTS

| | | |
|---|---|---|
| JP | 2001-285778 A | 10/2001 |
| JP | 2002-081955 | 3/2002 |
| JP | 2002-125183 A | 4/2002 |
| JP | 2003-269981 | 9/2003 |
| JP | 2003-281169 | 10/2003 |
| JP | 2004-045651 | 2/2004 |
| JP | 2004-069438 A | 3/2004 |

| link data | | |
|---|---|---|
| trip to ○○ | : Music-0012, | G1-P1,G2-P2,G3-P3,··· |
| home coming | : Music-0023, | G1-P1,G2-P2,G3-P3,··· |
| drive | : Music-0034, | G1-P1,G2-P2,G3-P3,··· |
| | ⋮ | |

IMAGE PROCESSING SYSTEM, METHOD AND APPARATUS FOR CORRELATING POSITION DATA WITH IMAGE DATA

This application is a divisional of application Ser. No. 11/133,919 filed May 20, 2005, now U.S. Pat. No. 7,627,420 which claims priority from Japanese Patent Appl. No. JP 2004-150364 filed May 20, 2004; Japanese Patent Appl. No. JP 2004-271811 filed Sep. 17, 2004; and Japanese Patent Appl. No. JP 2004-373445 filed Dec. 24, 2005, herein incorporated by reference in their entireties.

FIELD OF THE INVENTION

The present invention relates to a technique, implemented as an image processing system, method or apparatus, for correlating position data with image data. The position data is obtained by a position acquiring means and the image data, which can be photographic image data, is obtained by image data acquiring means.

DESCRIPTION OF THE RELATED ART

The technique relating to an image processing system having the above-described construction is known from e.g. Japanese Patent Application "Kokai" No. 2002-81955 (Patent Document 1), Japanese Patent Application "Kokai" No. 2003-269981 (Patent Document 2) and Japanese Patent Application "Kokai" No. 2003-281169 (Patent Document 3).

More particularly, Patent Document 1 discloses a navigation apparatus operable to store image data (e.g. photographic image data) and sound data (e.g. background music data) as additional information in correspondence with navigation data to a certain destination or route data relating to a route along which a vehicle has actually traveled to reach a certain destination and to output e.g. such correlated photographic image data and e.g. the background music data when a display unit displays the navigation data or the route data.

With this navigation apparatus, a present position detected by a position detector (corresponding to "position acquiring means" of the present invention) is displayed on a map through a map matching processing and in response to an input of a destination or a route to the destination, a route search operation is effected to display navigation data on the map. When this navigation route is registered (entered), in accordance with a user's operation, the additional information such as desired image data relating to the navigating route is stored in correlation with the navigating route. Then, when needed, the additional information thus stored will be selectively retrieved from the apparatus to be displayed.

Patent Document 2 discloses a basic operation mode of a navigation apparatus for causing a display panel to display road map data and a self-position data through a map matching operation.

More particularly, the apparatus inputs data from a DVD-ROM storing therein specifying data for specifying a geographic point, a real image(s) of the point, image display position data for displaying the real image and link data for linking the real image to the road map data. Then, in response to a user's operation for designating a point, the apparatus displays, on the display panel, a recorded real image on the road map.

Patent Document 3 discloses a portable media contents player incorporating in a body thereof a contents data storage section for obtaining and storing e.g. music and/or image contents (mainly music contents) from an external device. After the storage, a controller of the player is operable to reproduce or play back the contents when demanded. According to this Patent Document 3, it is described that the above contents data can also be video image or still image.

If a car navigation system is to correlate image data with route data of a route the vehicle (car) has actually traveled, and if the system is to correlate a plurality of image data, the system needs to effect an operation for specifying respective position on the route and a further operation for correlating pre-selected image data with the specified position.

In the above respect, the invention of Patent Document 1 provides an editing function for allowing manual editing of inputted additional information for its storage in correlation with the route data. For the same purpose, the invention of Patent Document 2 employs the link data for linking the real image of each point with the map data. This link data is generated by creating an icon from the real image and a user's input operation of an address of the point such as the name of the city, town, etc.

In recent years, the digital cameras have been improved in their performances and have been increasingly inexpensive as well. Hence, many users carry a digital camera when traveling in their private cars to a sightseeing area to take photos of scenic spots and places of historic interest or of snapshots with such spots or places as backgrounds. Ideally, such photos should be printed on print papers and stored in a photo album.

However, photographic image data obtained by a digital camera can be conveniently displayed on a monitor of a personal computer. For this reason, many users would often enjoy once the photos (data) on the monitor of the computer, then would not use or enjoy them thereafter.

On the other hand, when a user is to travel to a same sightseeing area once visited by driving in his/her own car, if the user can enjoy the respective places visited there by viewing the photos taken there before, such viewing will increase the joy of traveling there again. As described above, however, in actuality, many users increasingly tend to do without obtaining any prints of the photographic image data. On the other hand, even if a user obtains the prints of the photographic images of previously visited sightseeing place and files them in a photo album, the user will find it troublesome to carry the album with him/her when traveling again to that place. In these respects, there remains room for improvement.

Further, during hiking or trekking, one often takes photos of natural subjects such as mountains or fields as well as snap photos with the mountain or the like as the background. However, unlike image data of sightseeing place, photographic image data obtained of a mountain or the like usually lacks any visually distinguished photographic subject, which often makes difficult accurate identification of the point of photography later based on the acquired image data.

The photographic image data obtained not only during trekking, but also sightseeing, such data should ideally be printed on e.g. print papers and stored in a photo album. However, as described hereinbefore, many users choose to enjoy only the data being displayed on a monitor connected to a personal computer in the form of "slide show". In particular, when the image data are displayed conveniently in the form of a slide show on the PC, the image data are just switched over on the display according to the order of their photographic operations. Hence, the user cannot recognize his/her traveled route. In this respect too, there has been a desire for improvement.

In order to overcome such inconveniences, it is conceivable to employ the recently developed type of digital camera having the GPS (Global Positioning System) to identify the point of photography by taking advantage of the GPS function.

However, such up-to-date digital camera having the GPS function is much more expensive than more "conventional" digital cameras without GPS function. There has been also proposed a technique for realizing an operation which allows positioning data obtained by the GPS function to be displayed on map data in order to identify the point of each photography. However, even when this technique is employed, the technique is just operable to display each image data and map and the point of photography where the data was obtained on the map data. Hence, in order to correlate a plurality of photographic points with a plurality of image data acquired at the respective points, with taking time lapse into consideration, the technique requires some manual editing operation. Therefore, this technique too has room for improvement in terms of convenience.

In view of the above-described state of the art, there is a need for an apparatus which allows a user to readily grasp the point of photography where image data was obtained by a digital camera not having the GPS function, when e.g. displayed on a personal computer, without effecting any special operation such as an edit operation.

SUMMARY OF THE INVENTION

A primary object of the invention is to realize an image processing technique which allows a user to grasp the point of photography of image data acquired by a digital camera.

For accomplishing the above-noted object, according to one aspect of the present invention, there is proposed a navigation system comprising:

a processing unit for generating route data relating to a route along which a vehicle has actually traveled, from position data acquired by position acquiring means;

an image data acquiring section for acquiring image data;

a first storage section for storing the image data acquired by the image acquiring means according to groups of respective destinations;

a second storage section for storing the route data generated by the processing unit;

link data generating means for correlating the respective destinations with the respective route data via link data; and outputting means configured to extract a group linked to a destination by the link data in response to a manual designation of a route data stored in the second storage section or to a manual or automatic designation of a designation included in that route data and then to output the image data included in that group from the first storage section to an outputting section.

With the above construction, for example, after the image data acquiring means acquires image data obtained by a digital camera, the first storage section stores this image data according to a group associated with each destination and the second storage section stores a route along which the vehicle has actually traveled. After the image data and the route data are stored in this way, the link data generating mans can correlate the destination stored in the first storage section with route data stored in the second storage section. Subsequent to this correlating or linking operation, when a user manually selects route data stored in the second storage section and then manually selects a designation included in that route data or the position acquiring means automatically designates a destination, the outputting means extracts a group linked to that destination via the link data and then outputs the image data included in that group from the first storage section to an outputting section.

As a result, when the outputting means is adapted for e.g. displaying image data on a display unit, the display unit can display image data correlated with the manually selected destination or the present position of the vehicle. Further, even when a number of image data are to be displayed, this does not require the many image data in the form of thumbnails, thus avoiding complication of contents to be displayed.

According to one preferred embodiment of the navigation system, said processing unit self-generates route data and said second storage section stores this self-generated route data, and in response to a manual or automatic designation from a plurality of destinations included in the route data, the image data included in a group correlated with that designation is read from the first storage section and displayed.

With this construction, for example, route data relating to the shortest route to the designation or imaginary route data can be freely generated, and by correlating image data according to a group with each destination present on the route data, display unit can display a simulation of traveling of the vehicle on that route data and image data of the group corresponding to the designation of the vehicle. Namely, with the above construction, e.g. route data of a straight or freely set curved route can be generated and the display unit can display such straight or curved linear route data, rather than map data and display also image data for each destination on that route date. In this way, a simple mode of display is made possible.

According to another preferred embodiment of the present invention, the system further comprises a map data storage section for storing map data; and said processing unit extracts from the map data storage section, map data corresponding to the position data acquired by the position acquiring means and causes the display unit to display this map data and the route data on that map data.

With this construction, the display unit displays map data and displays also the route data on that map data. Hence, this facilitates the user's grasping the detailed of the route along which the vehicle has traveled. And, for instance, when the display unit displays the image data, with reference to the map data and the route data, the user can visually grasp the point of the photography of the image data, i.e. the point where the image data was obtained, easily.

According to a still further preferred embodiment of the navigation system, said image data acquiring section includes a semiconductor drive for acquiring image data from a semiconductor medium adapted for storing image data obtained by a digital camera or includes a terminal for acquiring image data stored in a digital camera via a communication channel.

With the above construction, by acquiring image data from a semiconductor medium commonly used in a digital camera or via a cable connected to the digital camera, the system can readily acquire image data obtained by a digital camera.

According to another preferred embodiment of the navigation system of the invention, the navigation system further comprises a media drive for storing data in a storage medium and storage processing means for storing data in a storage medium set to said media drive.

Preferably, said storage processing means is adapted for storing, in the storage medium set to said media drive, a computer-executable program, the image data stored in the first storage section, the route data stored in the second storage section and the link data.

With this construction, into the storage medium such as a CD-R, DVD-R, etc. set to the media drive, the storage processing means stores the image data, the route data, the link data and the outputting means realized in the form of a program. Then, when the medium storing such data is set to a standard personal computer, the computer can display the image data for each destination in the same display mode as the display on the display unit of the navigation system.

For accomplishing the above-noted object, according to another aspect of the present invention, there is proposed a computer-executable program having instructions for realizing an image data storing function for storing a plurality of acquired image data according to groups of respective destinations;

a route data storing function for storing route data indicative of a route of a vehicle;

a link data generating function for correlating the respective destinations and the respective route data with the grouped image data; and an outputting function for extracting a group linked to a destination by link data and outputting image data included in that group, in response to a manual designation of a designation included in that route data.

With the above construction, with such minor improvement of the conventional navigation system, i.e. not more than the addition of the image data acquiring means thereto and installing the above-described program therein, there is realized the navigation system wherein the image data storing function stores image data, the route data storing function stores route data, the link data generating function correlates each designation present on the route data with the grouped image data and the outputting function outputs the image data correlated to each designation via the link data.

For accomplishing the above-noted object, according to a still further aspect of the present invention, there is proposed an image processing system comprising:

a processing unit for correlating position data acquired by position acquiring means with photographic image data acquired by an image data acquiring section;

an image data storing section for storing map image data indicated by said position data; and an outputting section for outputting the photographic image data;

wherein said position acquiring means acquires timing data for specifying a time when said position data was acquired;

said processing unit includes a link processing means for correlating photographic date data annexed to said photographic image data and said timing data by correlating said position data with said photographic image data via link data; and said processing unit further includes output controlling means for outputting map image data extracted from the image data storage section based on the position data and the photographic image data correlated to the position data via the link data to said outputting section.

With the above construction, based on the timing data of the position data acquired by the position acquiring means and the photographic date data annexed to the photographic image data, the link processing means generates the link data and effects the correlation. Hence, for instance, it becomes possible to automatically effect the operation for correlating photographic image data obtained by a digital camera at a location where the position acquiring means was present with its position data. Further, the outputting section can be a display unit, a media drive for storing in a medium, etc. Then, as the position data and the photographic image data correlated therewith and the link data are outputted by the output controlling means to the outputting section, these data can be obtained from the outputting section. As a result, there is realized a system which allows position data to be readily correlated with photographic image data for user's gasp of the photographic image data taken at that position, by using the timing data of the position data acquired by the position acquiring means and the photographic date data annexed to the photographic image data.

According to one preferred embodiment of the image processing system of the invention, said outputting section is a display unit for displaying images and said processing unit is configured to effect a storing operation for storing a plurality of the position data within a set time period, storing the photographic image data acquired by the image data acquiring means and storing also the link data generated by the link processing means for correlating the photographic image data with the position data; and said output controlling means is configured to effect a playback operation for obtaining the position data by designating the timing data one after another, displaying the map image data corresponding to each position data on the display unit and displaying, also on the display unit, the photographic image data correlated to the position data acquired by the position acquiring means of the plurality of the position data stored by the storing operation.

With this construction, after the photographic image data is correlated with the position data, when e.g. the position acquiring means is moved, if this moved position acquiring means acquires position data corresponding to the position data stored already, then, the photographic image data correlated with such position data will be displayed on the display unit. Namely, if the system is implemented as a car navigation system or a portable navigation system, in e.g. a sightseeing place, after photographic image data such as photos of the sightseeing place or snap photos is stored in correlation with the place where the system was present, then, if the system is present again in the same sightseeing place (stored position), the stored photographic image data can be displayed, i.e. played back, on the display unit, so that the user can enjoy the images just like a photo album.

According to another preferred embodiment of the image processing system of the invention, said outputting section is a display unit for displaying images and said processing unit is configured to effect a storing operation for storing a plurality of the position data within a set time period, storing the photographic image data acquired by the image data acquiring means and storing also the link data generated by the link processing means for correlating the photographic image data with the position data; and said output controlling means is configured to effect, after the storing operation, a simulating operation for extracting one after another position data corresponding to designated timing data from the plurality of stored position data by designating the timing data one after another along a time base and then displaying, on the display unit, one after another the map image data corresponding to the plurality of position data extracted and extracting photographic image data correlated with the extracted position data and extracting the photographic image data correlated to the extracted position data and displaying the extracted photographic image data on the display unit.

With the above construction, after the correlation of the position data with the photographic image data, by effecting the simulation operation for designating the timing data one after another along the time base, the position data corresponding to the designated timing data are extracted one after another and the photographic image data correlated to the position data corresponding to the position data are displayed on the display unit. Namely, if the system is implemented as a car navigation system or a portable navigation system, in e.g. a sightseeing place, after photographic image data such as photos of the sightseeing place or snap photos is stored in correlation with the place where the system was present, then, by effecting the simulation operation, the user can enjoy the images just like a photo album.

According to a preferred embodiment of the image processing system, said outputting section is a media drive for storing data in a storage medium, and said processing unit is configured to effect a storing operation for storing a plurality of the position data within a set time period, storing the photographic image data acquired by the image data acquiring means and storing also the link data generated by the link processing means for correlating the photographic image data with the position data; and said output controlling means is configured to effect a storing operation for storing the position data, the photographic image data, the link data stored by the storing operation and map image data corresponding to the position data in the recording medium set to the media drive, With this construction, after the storing operation for storing the position data, the photographic image data and the link data is effected, these data can be stored in a storage medium. That is, the data stored in the storage medium can be displayed later on e.g. a display unit of a personal computer, when desired.

According to a further preferred embodiment of the image processing system of the present invention, said output controlling means writes the position data, the photographic image data and the link data stored in the storage medium in a data format which allows reading of the data according to the order along the time base of the timing data.

With this construction, the position data and the photographic image data stored in the storage medium can be read out according to the order along the time base, so that the system can allow use of the data similar to an "electric album" in which the points of photography and the images are linked to each other.

According to a further preferred embodiment of the image processing system of the present invention, said output controlling means writes the position data, the photographic image data and the link data stored in the storage medium and the map image data in a data format which allows reading of the data according to the order along the time base of the timing data.

With this construction, by using the GPS unit constituting the car navigation system, when e.g. a user travels in his/her own car, it is possible to correlate photographic image data obtained by a digital camera with the position data of the travel by the car. Then, for example, the display unit can display each position of the point where the photographic image data was obtained on the map data as well as such photographic image data.

According to a further preferred embodiment of the image processing system of the present invention, said position acquiring means comprises a UPS unit constituting a car navigation system and said map image data is map data used in the car navigation system and said output controlling means is a media drive for storing the data in a disc or semiconductor type storage medium.

With this construction, by using the GPS unit constituting the car navigation system, when e.g. a user travels in his/her own car, it is possible to correlate photographic image data obtained by a digital camera with the position data of the travel by the car. Then, for example, the storage medium such as a DVD-R can store the map data and the photographic image data and these data stored in that storage medium can be displayed later on a display unit of a personal computer for example.

According to a further preferred embodiment of the image processing system of the present invention, said image data acquiring section comprises a plurality of semiconductor drives for acquiring photographic image data from a semiconductor type storage medium used with a digital camera and said plurality of semiconductor drives are disposed adjacent a plurality of seats in a vehicle.

With the above construction, in a vehicle having a plurality of seats such as a sightseeing bus, a semiconductor drive can be disposed adjacent each seat for storing photographic image data obtained by a digital camera of each passenger seated at that seat. Then, such stored photographic image data are correlated to position data to be displayed on a display unit or stored in a storage medium.

For accomplishing the above-noted object, according to a further aspect of the present invention, there is proposed an image processing method comprising the steps of:

correlating position data acquired by a position acquiring section with photographic image data acquired by an image data acquiring section;

storing map image data indicative of position of position data in an image data storage section;

acquiring timing data for specifying a time when the position data was acquired;

a link processing step for correlating the position data with the photographic image data via link data so that photographic date data annexed to the photographic image data and the timing data may correspond to each other; and an outputting step for outputting the map image data extracted from the image data storage section based on the position data and the photographic image data correlated with the position data via the link data to an outputting section.

With the above construction, based on the timing data of the position data acquired by the position acquiring means and the photographic date data annexed to the photographic image data, the link processing means generates the link data and effects the correlation. Hence, for instance, it becomes possible to automatically effect the operation for correlating photographic image data obtained by a digital camera at a location where the position acquiring means was present with its position data. Further, the outputting section can be a display unit, a media drive for storing in a medium, etc. Then, as the position data and the photographic image data correlated therewith and the link data are outputted to the outputting section, these data can be obtained from the outputting section. As a result, there is realized a method which allows position data to be readily correlated with photographic image data for user's gasp of the photographic image data taken at that position, by using the timing data of the position data acquired by the position acquiring means and the photographic date data annexed to the photographic image data.

For accomplishing the above-noted object, according to a still further aspect of the present invention, there is proposed an image processing system comprising:

an image data acquiring section for acquiring image data obtained by a digital camera;

a data storing section for storing data;

a processing unit for storing the image data acquired by the image data acquiring section in the data storing section;

position acquiring means for acquiring position data; and a portable-sized apparatus body including a map data storing section for storing map data indicative of position of the position data acquired by the position acquiring means and an outputting section for outputting the data stored in the data storing section;

wherein said processing unit is configured to effect a position data storing operation for continuously acquiring the position data by the position acquiring means and storing the data in the data storing section, an image data storing operation for storing the image data acquired by the image data acquiring section in the data storing section, a link data generating operation for generating link data for correlating the position data with the image data, and a link data storing operation for storing the link data in the data storing section; and said processing unit is further configured to effect an outputting operation for causing said outputting section to output the position data stored in the data storing section, the map data indicative of the position of the position data and the image data correlated with the position data.

With the above construction, by the position data storing operation, the position data acquired by the position data acquiring means is continuously stored in the data storing section and when the image data acquiring section obtains the image data. Then, by the image data storing operation, the image data is stored in the storing section and by the link data generating operation, there is generated the link data for correlating the position data and the image data and by the subsequent link data storing operation, this link data is stored in the storing section. After the storage of data described above, by the outputting operation, the position data, the image data and the link data stored in the data storing section and the map data stored in the map data storing section can be outputted respectively. That is to say, according to this invention, when image data is acquired, it is possible to correlate this image data with the position data as data indicative of the point of photography where the image data was obtained. Moreover, these data and the map data indicative of the position of the photographic point can be outputted. Hence, if the outputted data are displayed on a monitor unit of a personal computer, based on the photographic point where the image data was obtained and a plurality of position data (plurality of position data continuously acquired), a route can be generated and the user can grasp these with reference to map data such as a geographical map or an illustration.

As a result, there is achieved an image processing system capable of storing image data obtained by a digital camera and outputting the data as image data in such a manner as to allow ready grasp of photographic points of the stored image data and the route traveled.

According to a preferred embodiment of the image processing system of the invention, the system further comprises link processing means for effecting the generation of the link data, said link processing means being operable to compare timing data for specifying the time of acquisition of the position data with photographic date data annexed to the image data and to generate link data which link timing data and photographic data agreeing with or similar to each other.

With this construction, when image data is acquired, the link processing means can automatically effect the correlation between this image data with position data. Hence, it becomes possible to eliminate the trouble of the user's effecting some special editing operation or the like.

According to a further preferred embodiment of the image processing system of the present invention, said apparatus body includes a display unit and said processing unit causes the display unit to display the map data corresponding to the position data and the image data correlated with the position data.

With the above construction, the display unit of the apparatus body can display the image data in association with e.g. detailed map data or a schematic map data such as a sightseeing map, as the map data, so that the user can confirm the point of the photography of the image data also.

According to a further preferred embodiment of the image processing system of the invention, said position acquiring means comprises a GPS unit for acquiring the position data by receiving radio waves from a plurality of artificial satellites.

With this construction, by acquiring high precision position data, the identification of the photographic point can be effected with higher precision.

According to a further embodiment of the image processing system of the invention, said position acquiring means comprises a GPS unit for acquiring the position data by receiving radio waves from a plurality of artificial satellites, said GPS unit storing, together with the position data, a time of the acquisition of the position data as said timing data;

said link processing means effects said linking operation for linking timing data and photographic data agreeing with or similar to each other, an automatic link mode in which photographic date data included in Exif data annexed to the image data obtained by the digital camera and the timing data agreeing therewith or similar thereto are linked to each other; and said link processing means effects also a correction link mode operation in which all photographic date data included in the Exif data annexed to the image data obtained by the digital camera are shifted by a same value and then the shifted photographic date data and the timing data are correlated with each other.

With the above construction, by acquiring high precision position data, the identification of the photographic point can be effected with higher precision. In addition, based on the timing data generated by this GPS unit and the photographic date data included in the Exif data annexed to the image data obtained by the digital camera, the position data and the image data can be automatically correlated with each other with high precision. Further, when e.g. there is a time error between a clock included in the digital camera and the timing data, by shifting all photographic date data included in the Exif data by a same value, the position data and the image data can be correlated with an appropriate timing.

According to a still further preferred embodiment of the image processing system of the invention, said image data acquiring section acquires image data from a storage medium used in the digital camera and if said processing unit determines that the storage medium is set to said image data acquiring section, the unit discriminates the plurality of image data stored in that storage medium and stores in the data storage section only image data excluding the image data stored already in the data storing section.

With the above construction, when a plurality of image data are stored, the system can eliminate the inconvenience of storing same image data in duplication and can store only the necessary image data in a reliable manner.

Further and other features and advantages of the invention will become apparent upon reading the following detailed description of the preferred embodiments thereof with reference to the accompanying drawings.

DESCRIPTION OF THE PREFERRED EMBODIMENTS

Next, preferred embodiments of the present invention will be described with reference to the accompanying drawings.

First Embodiment

Figure 1:
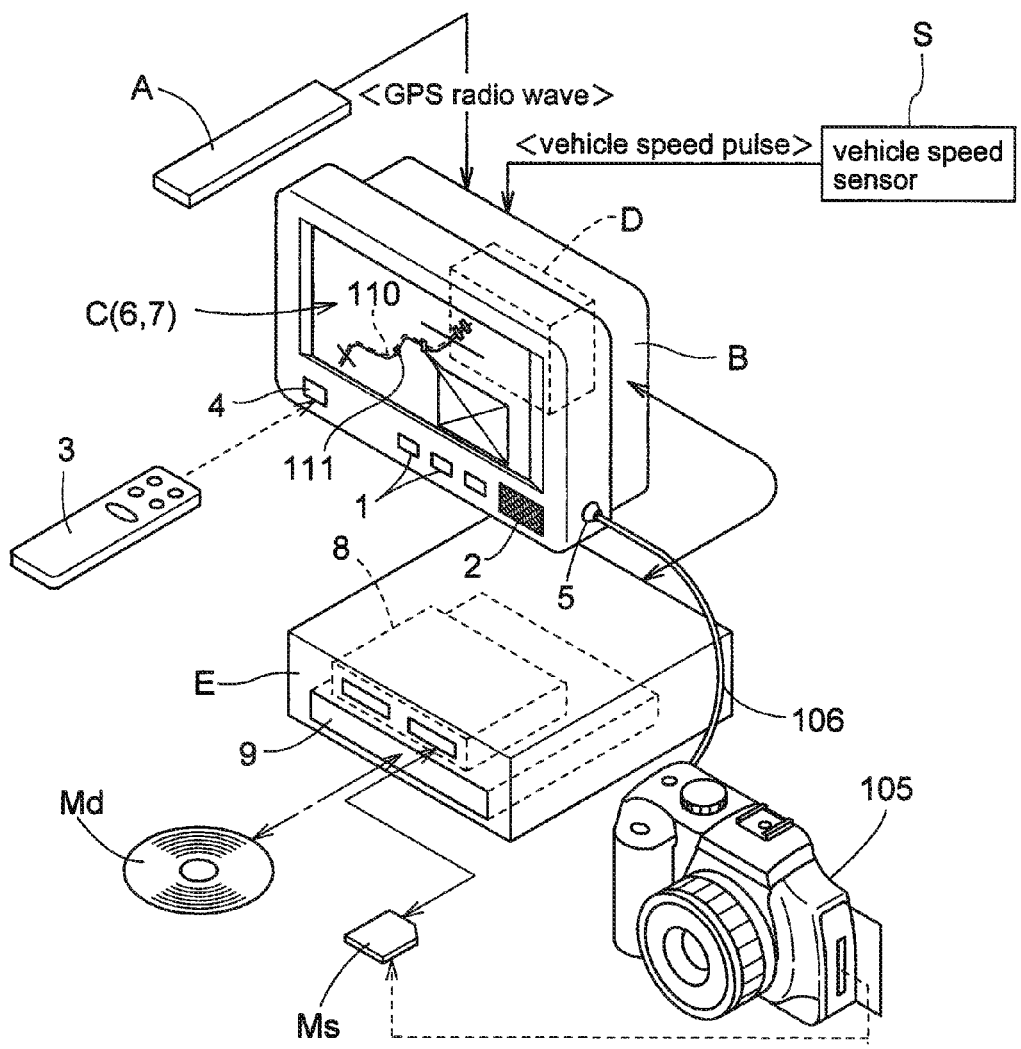
FIG. 1 is a view showing a construction of a navigation system according to a first embodiment of the present invention.
Figure 2:
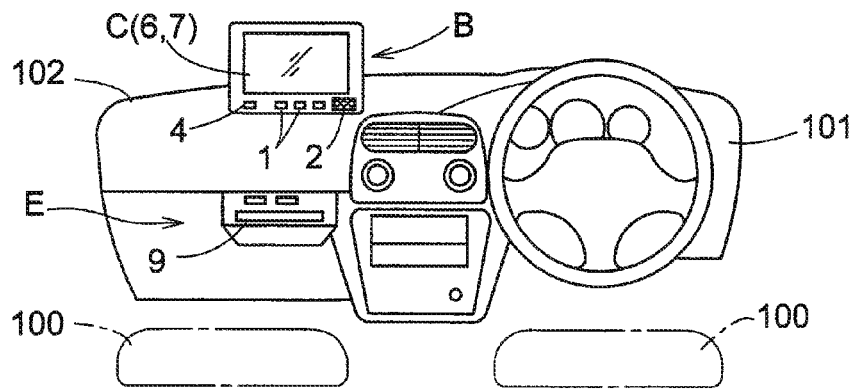
FIG. 2 is a view the car navigation system relating to the first embodiment and installed in an automobile.

As shown in FIG. 1 and FIG. 2, a navigation system relating to the present invention includes a system body B adapted for inputting signals received by an antenna unit A from a GPS satellite and vehicle speed pulse signals from a vehicle speed sensor S incorporated in a traveling line of the vehicle, a display unit C (an example of "outputting section") attached to a front face of the system body B, a processing unit D incorporated within the body B, and a drive unit E (an example of "media drive": acting also as image data acquiring means and an outputting section) provided separately from the system body B.

The system body B includes a plurality of switches 1, a loudspeaker 2 for outputting audio information, an infrared sensor 4 for receiving infrared signals from a remote controller 3 and an input/output terminal 5 for accessing to photographic image data.

This navigation system is adapted to be attached to a console 102 provided laterally of a gauge panel 101 disposed forwardly of a driver's seat 100 in a cabin of a private automobile. In operation, during a vehicle run, the system acquires in a realtime manner position data (longitude data and latitude data) relating to a present position of the vehicle based on the signals from the GPS satellite and the vehicle speed pulse signal from the vehicle speed sensor S and causes the display unit C to display map data (an example of map image data indicative of the position of position data) corresponding to the position data in a set enlargement scale and to display also the current position of the vehicle in the form of a vehicle symbol on the map data.

Further, this navigation system, in response to a designation of a destination system navigates the driver during the vehicle run by displaying, on the map, a route to be traveled to reach such destination. The above-described functions of this navigation system are substantially same of those of the conventional systems. The navigation system according to the present invention is characterized in that this system is capable of effecting an operation for storing a plurality of photographic image data on and in correlation with a traveled route of the vehicle and displaying such stored photographic image data on the display unit C and an operation for storing an "electric album" including such photographic image data in a storage medium, The display unit C includes a crystal liquid display section 6 for displaying necessary data such as map data, photographic image data, etc. and a touch panel section 7 for detecting a touch operation such as a finger touch operation. The plurality of switches 1 realize such operations as ON/OFF of the entire navigation system, switchover of the display mode, etc. The remote controller 3 realizes necessary operations from a position away from the system body B. The loudspeaker 2 is used for providing human voice navigation as well as playing music data to be described later.

The drive unit E (an example of media drive and "image data acquiring means") includes a semiconductor drive 8 for acquiring image data from a semiconductor odium Ms (an example of "storage medium") such as a flash memory storing therein photographic image data obtained by a digital camera 105 and a disc drive 9 for allowing acquisition and storage (writing) of data from a plurality of kinds of large-capacity disc type media Md (another example of "storage medium") such as a CD-R, DVD-R. Incidentally, the semiconductor drive 8 includes a plurality of inserting portions to cope with a plurality of types of semiconductor media commercially available such as a Compact Flash (registered trademark), a Smart Media (registered trademark), a Memory Stick (registered trademark).

The input/output terminal 5 (another example of "image data acquiring means") is used for acquiring photographic image data stored in the digital camera 105 via a cable 106 designed under the SUB (Universal Serial Bus) standard, IEEE1394 standard, etc. provided for connection with the digital camera 105. Incidentally, the scope of the present invention does not exclude the possibility of acquiring the photographic image data of the digital camera 105 by a wireless technology. Hence, the image data acquiring means can utilize a wireless technology such as Bluetooth for transmission and reception of the photographic image data.

Figure 3:
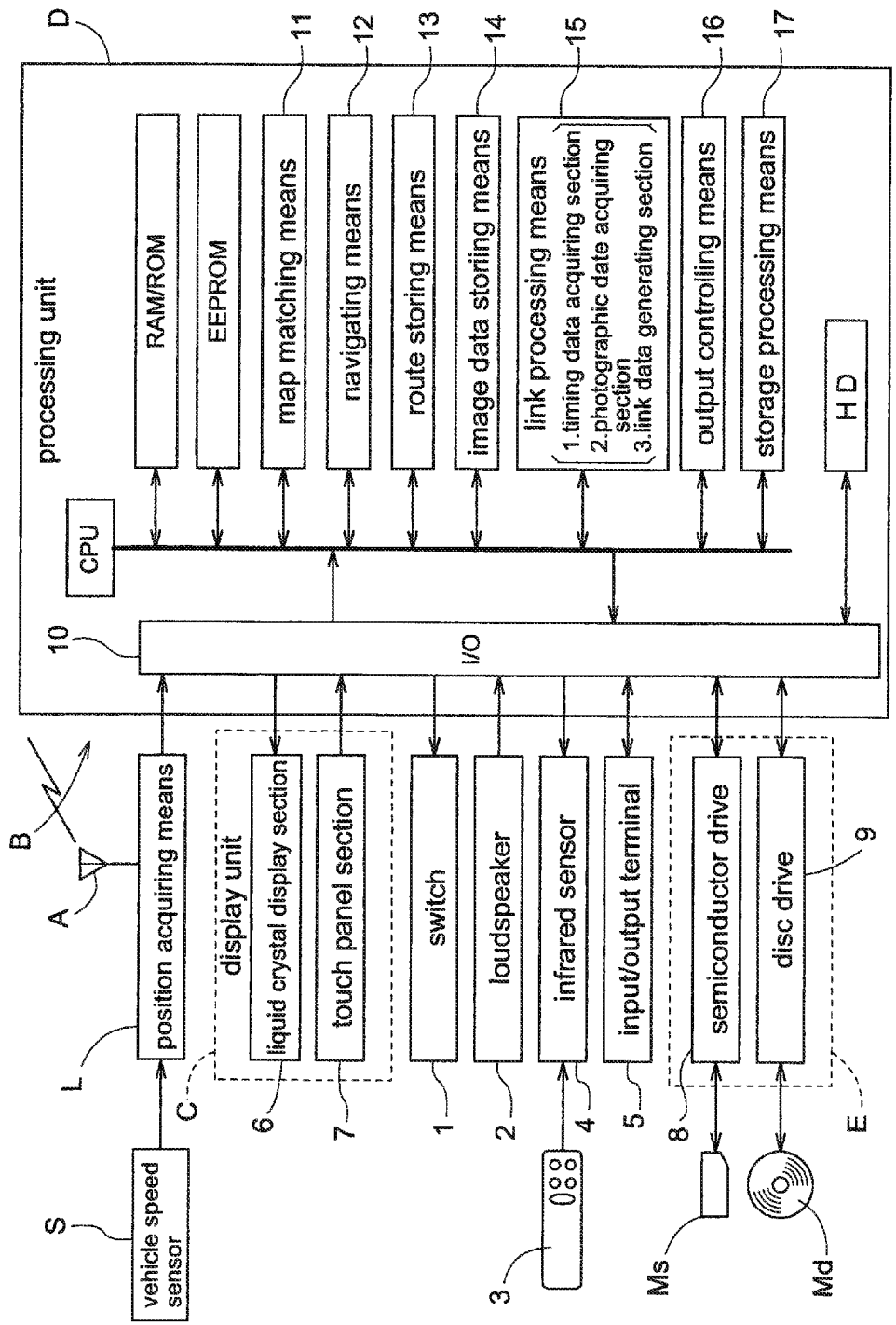
FIG. 3 is a circuit block diagram of the navigation system of the first embodiment.

FIG. 3 is a block diagram showing an exemplary construction of this navigation system. As shown, the system body B includes an input/output interface 10 for realizing access of information to a microprocessor. To this input/output interface 10, there is provided a signal system for allowing data access from a position acquiring means L (an example of GPS unit), the liquid crystal display section 6, the touch panel section 7, the plurality of switches 1, the loudspeaker 2, the infrared sensor 4, the input/output terminal 5, the semiconductor drive 8, the disc drive 9, the hard disc HD, respectively.

The position acquiring means L is operable to acquire an electromagnetic wave received by the antenna unit A from a GPS satellite and also to acquire vehicle position data (longitude and latitude data) by inputting the vehicle speed pulse signals from the vehicle speed sensor S in realtime as well as a time of acquisition of this position data as timing data. This position acquiring means L can be adapted for acquiring position information from radio waves form a plurality of wave transmitting sources which are installed on the ground surface. Also, if necessary, by using a gyroscope for detecting a vehicle posture, an acceleration sensor for detecting acceleration of the vehicle or using a radio wave from a wave transmitting source on the ground in combination, the precision of the vehicle position information can be enhanced.

The hard disc HD operates to store the photographic image data and operates also as a map database (an example of "image data storing section") for storing map data of predetermined areas as well as music database for storing the music data.

The processing unit D includes the following components connected to the data bus from the microprocessor, i.e. a semiconductor memory RAM/ROM, a nonvolatile memory EEPROM, a map matching means 11, a navigating means 12, a route storing means 13, an image data storing means 14, a link processing means 15, an output controlling means 16, and a storage processing means 17. Incidentally, in order to realize various control operations in this processing unit D, in addition to the data bus, control buses, address busses, etc are also needed. However, in order to avoid complexity of the illustration, in the figure, such control busses, address busses, or interfaces, etc. are not illustrated.

The map matching means 11 is configured for extracting map data corresponding to the position data acquired by the position acquiring means L from a map database stored in the hard disc HD and causing the display unit C to display the data with a predetermined enlargement scale. The navigating means 12 is configured for extracting a predetermined route to a destination from the map data and causing the display unit C to display the route in the form of a line on the map data and to display also necessary operations such as a right turn or a left turn each point such as an intersection and causing also the loudspeaker 2 to output such necessary operation as a right turn or a left turn in the form of human voice language.

The route storing means 13 is configured for writing the position data acquired by the position acquiring means L at every set interval into the hard disc HD or the semiconductor memory RAM at each timing of the acquisition of each position data, as a route actually traveled by the vehicle. Incidentally, when this route 110 stored by this route storing means 13 is displayed on the display unit C, this is done as indicated by broken lines in FIG. 7. As shown, on this route 11, there is shown a vehicle symbol 111 and on this route 110, there are also shown photographic points P to be described later.

Figure 5:
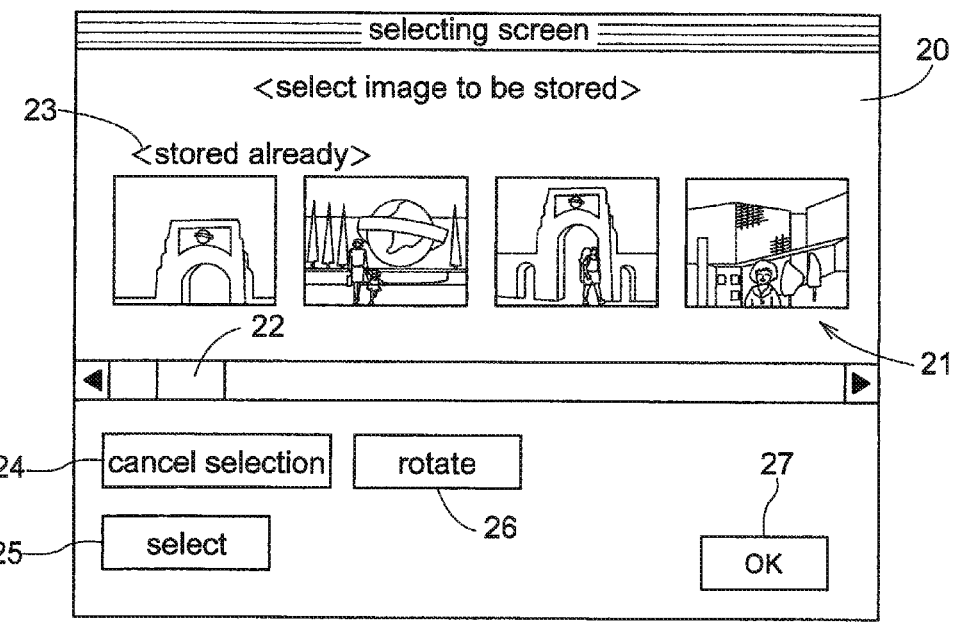
FIG. 5 is a view showing a selecting screen relating to the first embodiment.

The image data storing means 14 is configured for storing the photographic image data acquired via the semiconductor drive 8, the disc drive 9 or the input/output terminal 5 in the hard disc HD. In case a plurality of image data are to be stored via the input/output terminal 5 into the hard disc HD, as shown in FIG. 5, the display unit C displays a selecting screen 20 for allowing input of photographic image data. Then, by selecting necessary images on this selecting screen 20, the selected plurality of photographic image data will be stored (this function will be detailed later).

The link processing means 15 includes a timing data acquiring section for acquiring timing data for specifying the timing of the acquisition of the position data by the position acquiring means L, a photographic date data acquiring section for acquiring photographic date data from Exif data annexed to the photographic image data, and a link data generating section for generating link data from these data, i.e. the timing data and the photographic date data. Incidentally, these sections, i.e. the timing data acquiring section, the photographic date data acquiring section and the link data generating section, will be used respectively when the photographic image data are complied into an electric album as will be described later.

Figures 8, 9:
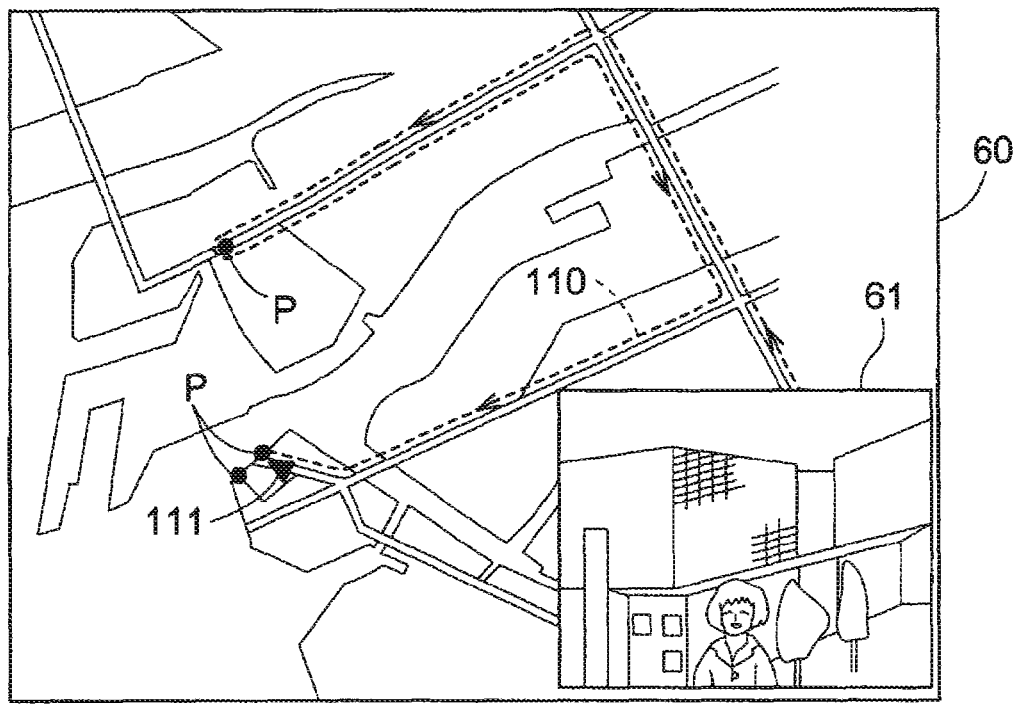
FIG. 8 is a view showing a playback screen in an actual traveling mode relating to the first embodiment.
FIG. 9 is a view showing construction of Exif data relating to the first embodiment.

The Exif data is annexed to the photographic image data as a header for the file constituting the photographic image data obtained by the digital camera 105. FIG. 9 shows an exemplary construction of this data. Main information included in this Exif data stores therein the name of the manufacturer and the product name of the digital camera and auxiliary information also included therein stores not only data of an exposure time, an image width and height, but also an actual photographic date in the unit of year, month, date, hour and minute. So that, the photographic date acquiring section of the link processing means 15 acquires the actual photographic data as the photographic date data.

The output controlling means 16 is configured for causing the display unit C to display photographic image data correlated with the position data.

The storage processing means 17 is configured for storing the date of the selected route 110, the plurality of photographic image data correlated with the plurality of position data (photographic points) present on that route 110 and map data corresponding to the route 110 and configured for also storing music data, if any, correlated therewith, as an "electric album" in the storage medium such as the disc medium Md, etc. (mode of control of this operation will be described later). Then, the storage medium (e.g. DVD-R) storing the data as the electronic album can be "played" (reproduced) on a personal computer for reproducing the map data, the photographic image date, etc.

Figure 7:
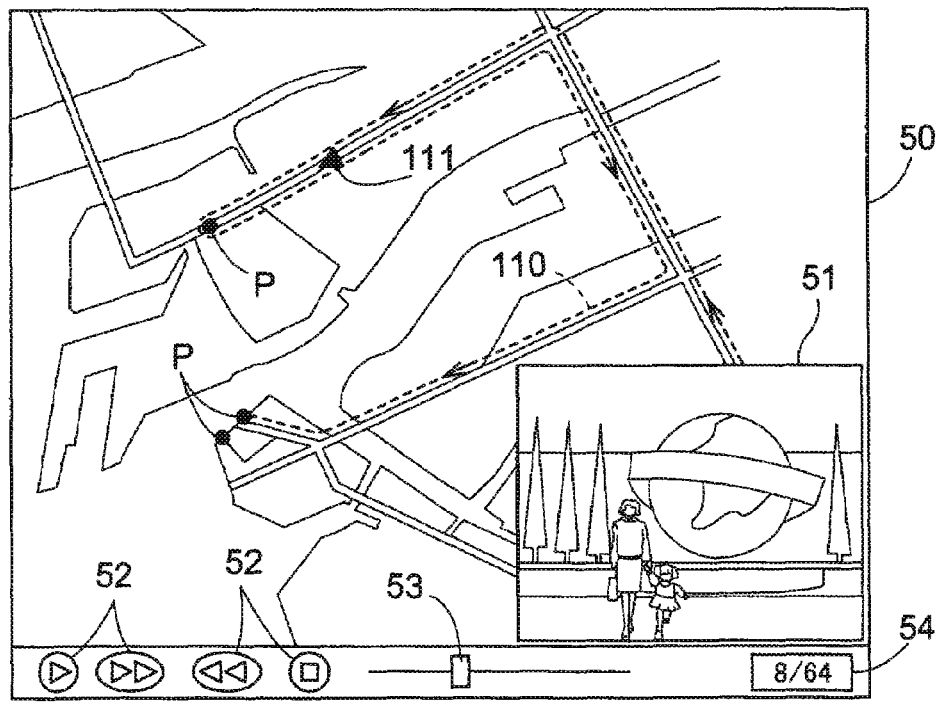
FIG. 7 is a view showing a playback screen in a playback mode relating to the first embodiment.

Further, when the storage medium storing the data as the electronic album is played on the personal computer, as shown in FIG. 7, the display unit displays the map data and the route 110. Further, on this display, there is effected display of a simulation of the vehicle symbol 111 as running on the route 110. And, during this simulation, when the vehicle symbol 111 reaches each photographic point P, the photographic image data correlated with that photographic point P (position data) will be shown on the display unit C.

Incidentally, the present invention is not limited to data implementation of such electronic album for automatic playback. Instead, as an alternative electronic album configuration, the system can simply store the data of the route 110, the photographic image data, the map data or the like. Then, e.g. in response to a user's clicking on the mouse of the personal computer or operation of a predetermined key on the keyboard thereof, the photographic image data correlated to the respective photographic points on the route 110 may be displayed according to the order of photographic operations thereof.

Also, in this embodiment, it is contemplated that the map matching means 11, the navigating means 12, the route storing means 13, the image data storing means 14, the link processing means 15, the output controlling means 16, and the storage processing means 17 are realized in the form of software (programs) which can be stored in the semiconductor memory RAM. Instead, some or all of these can be realized as hardware such as a wired-logic.

Figure 4:
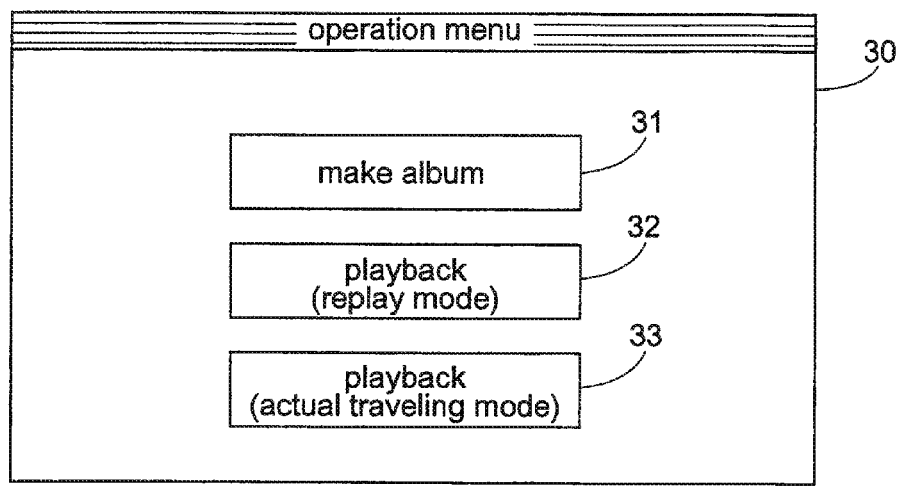
FIG. 4 is a view showing an operation menu relating to the first embodiment.

With the navigation system of the invention, in response to an operation on the switch 1 or the remote controller 3, the display unit C displays an operation menu 30 shown in FIG. 4. Thereafter, in response to a user's selective finger-touching operation on an album making button 31 shown in this operation menu 30, a playback button 32 in a playback mode (simulation mode) or a playback button 33 in an actual traveling mode, the system can effect the selected operation as described next.

More particularly, if the user operates the album making button 31 on this operation menu 30, an electric album will be created. In this system, however, prior to this operation of the album making button 31, the system has already automatically obtained the positions traveled by the vehicle and acquired a plurality of photographic image data at the appropriate timing.

Figure 10:
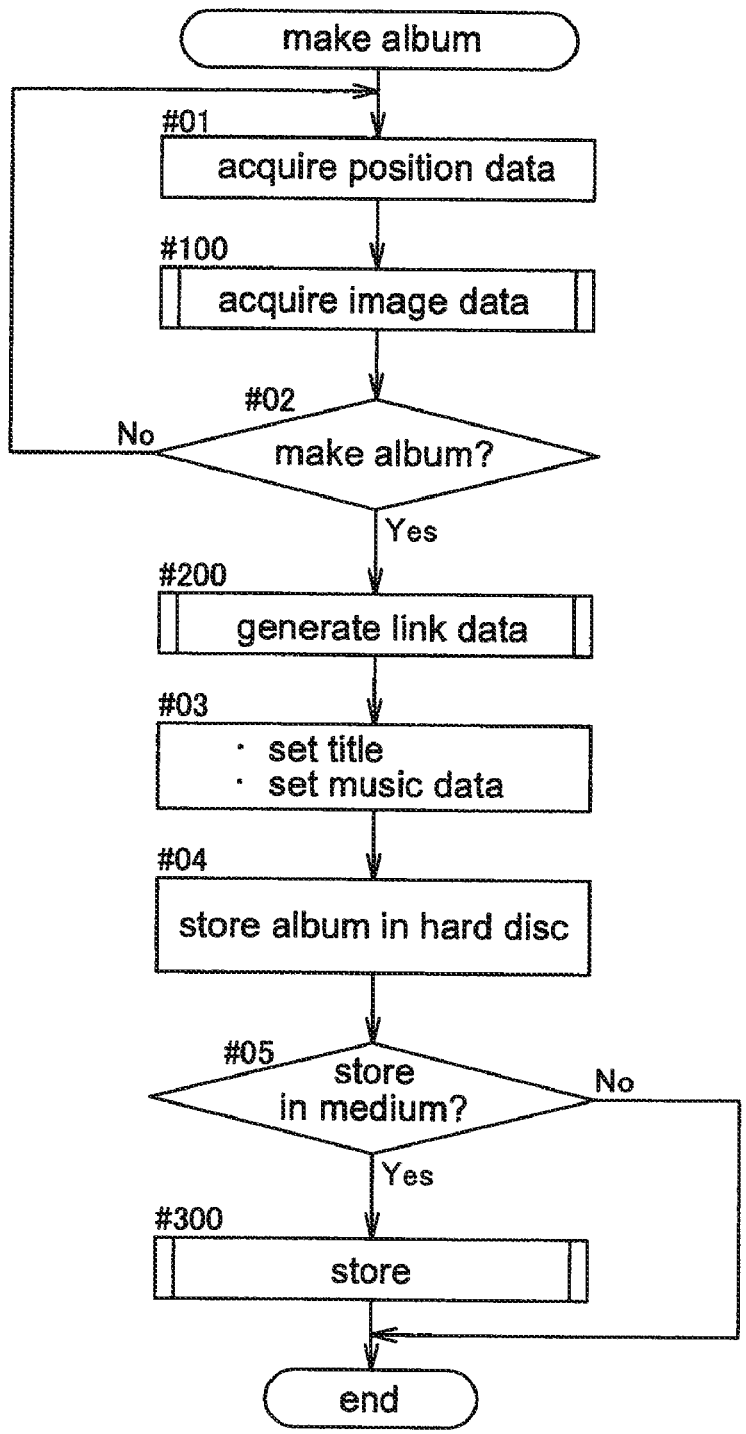
FIG. 10 is a flowchart illustrating a process for making an electronic album relating to the first embodiment.

Namely, the navigation system of the invention executes a process illustrated in the flowchart of FIG. 10. That is, the position acquiring means L acquires the position data at the predetermined interval (step #01) and executes an image data acquiring routine for acquiring photographic image data at any timing (step #100). This process will be effected continuously until the operation for making an electronic album is selected (step #02), If the process for making the album is selected (i.e. when the album making button 31 is operated), the link processing means 15 generates link data (step #200) and sets map data corresponding to position data correlated to the photographic image data via the link data and sets also the title and the music data and then stores the electronic album made in the hard disc HD. Further, if an operation for storing the data into a medium is selected, the system executes an operation for storing the electronic album in the disc medium Md (e.g. DVD-R) as the storage medium (steps #03 through #05, step #300).

Figure 11:
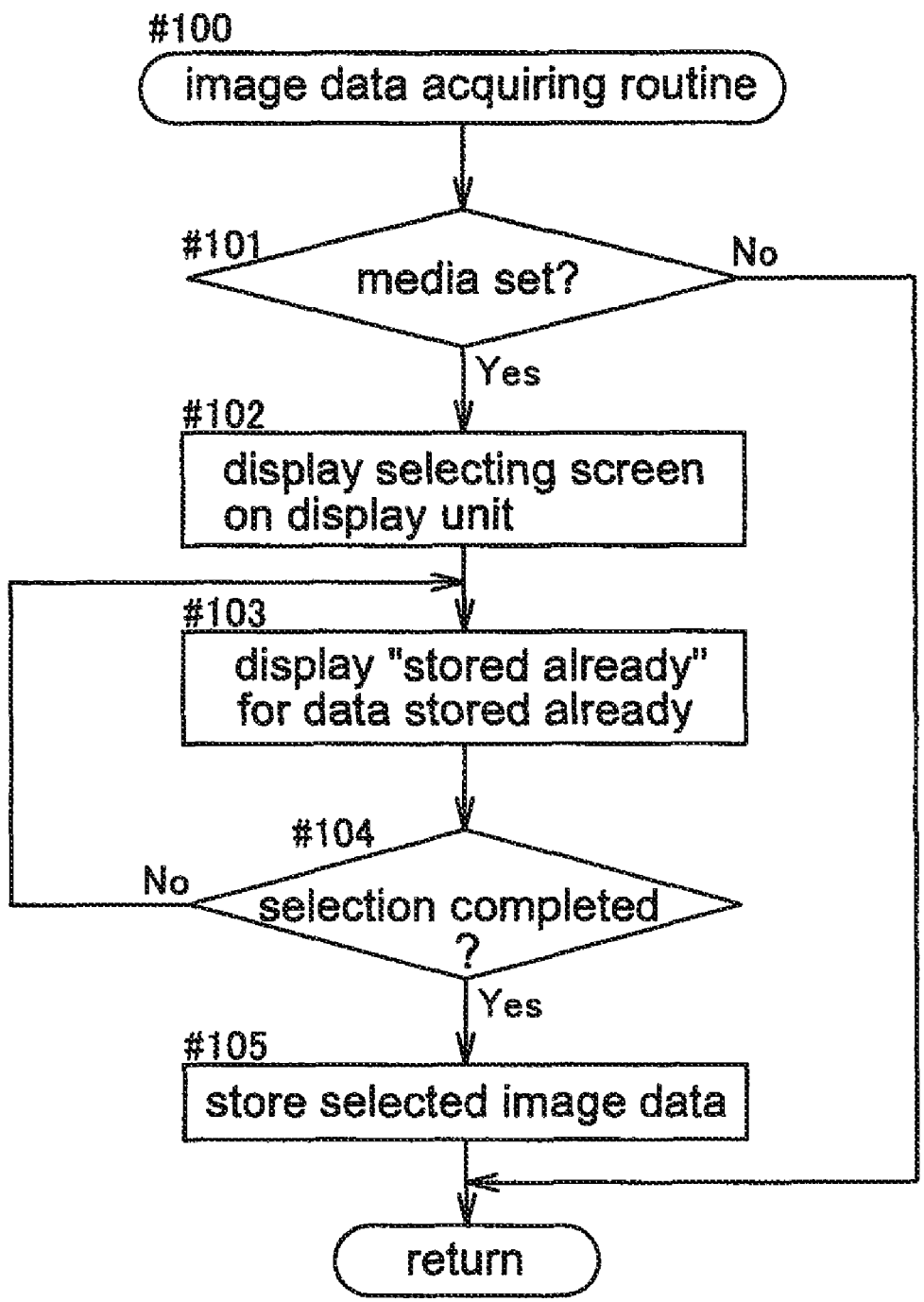
FIG. 11 is a flowchart illustrating an image data acquiring routine relating to the first embodiment.

In the image data acquiring routine (step #100), the system executes an operation illustrated in the flowchart of FIG. 11. Namely, only when the storage medium Md is set to the semiconductor drive 8, the display unit C will displays a selecting screen 20 shown in FIG. 5 (steps #101, #102).

This selecting screen 20 displays all the photographic image data stored in the storage medium in the form of thumbnail in an image displaying area 21 and allows confirmation of all photographic image data by an operation on a scroll bar 22. Further, of these photographic image data displayed in the image displaying area 21, if it is found that any of the data was stored already in the hard disc HD, information 23 such as "stored already" will be displayed. So that, the other photographic image data than such pre-stored data will be automatically selected as data to be stored (step #103).

Further, if the user finds any one of the automatically selected images as being of poor photographic quality or unneeded for the album, then, the user will e.g. touch his/her finger on such photographic image for its selection and then touch the finger on a selection canceling button 24, thereby to cancel the selection. After this selective canceling operation, the user can select the same image again by operating the selecting switch 25, if desired.

Also, if the user operates a rotating button 26 after the designation of the photographic image data, the designated photographic image data can be rotated by 90 degrees increment. After such selection, if the user operates an OK button 27 (step #104), the selected photographic image data is stored in the hard disk HD (step #105). Incidentally, in this embodiment, the operation for selecting the photographic image data is realized by the touch panel section 7 of the display unit C. Instead, the system can include an interface for realizing the above operation by a user's operation on the switches 1 or on the remote controller 3.

Also, when an electronic album is to be made after the storage of the position data and the photographic image data, the display unit C displays the operation menu (screen) 30 and the user will operate the album making button 31 on the screen (YES at step #02).

Figure 12:
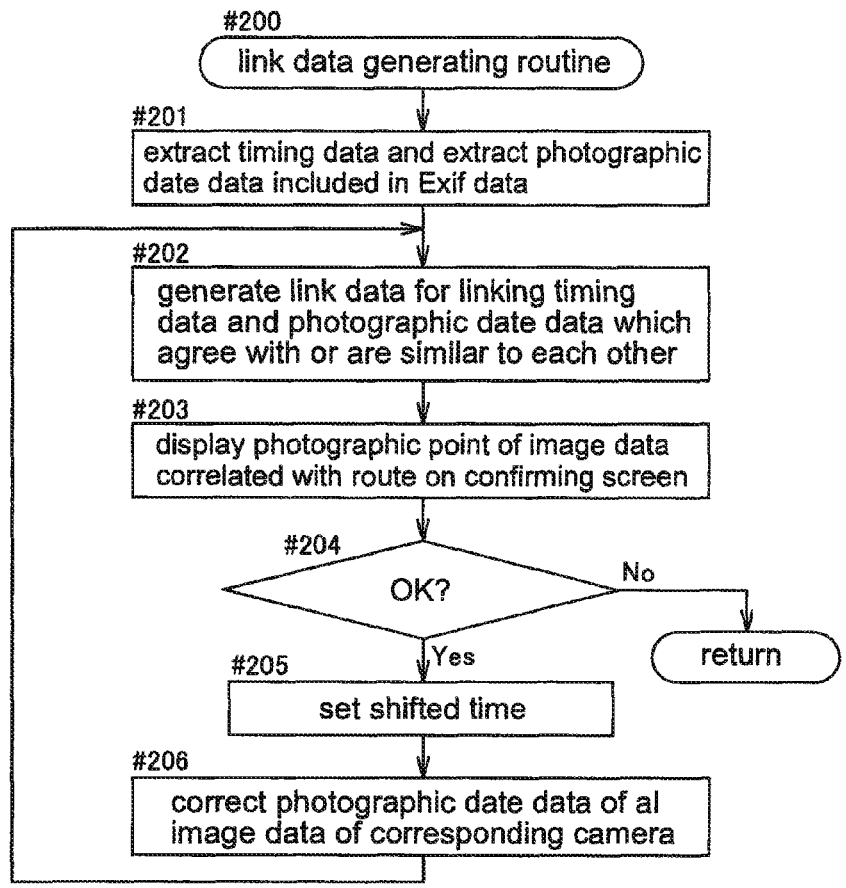
FIG. 12 is a flowchart illustrating a link data generating routine relating to the first embodiment.

After the above operation, the system executes the operation for generating the link data illustrated in the flowchart of FIG. 12. More particularly, the timing data acquiring section of the link processing means 15 extracts the timing data stored in the hard disc HD and the photographic date acquiring section of the link processing means 15 extracts the photographic date data from the Exif data annexed to each photographic image data.

Next, the link data generating section of the link processing means 15 generates link data for correlating the plurality of timing data and the plurality of photographic date data which are in agreement with or similar to each other (steps #201, #202). The operation at this step #202 corresponds to the operation under the automatic link mode and after the generation of link data described above, as shown in FIG. 6, the display unit C displays the route 110 (to be detailed later) and displays also the photographic point(s) P of the photographic image data on that route 110 (step #203).

When the photographic points P are displayed in the manner described above, the user (operator) will judge presence/absence of error relative to the actual photographic positions. Such error is attributable to a time difference which may be present between the timing data generated by the position acquiring means L and a clock incorporated in the digital camera 105. If such difference or error is present, then, the user will effect an operation for correcting the photographic date data. With this, the photographic date data of all the photographic image data obtained by the digital camera 105 will be corrected at one time (steps #204 through #206). And, link data will be generated again.

Upon generation of such link data, the system prompts the user to confirm by displaying the photographic points P on the route 110. And, if the operator confirms the error has been corrected, then, this process is completed. The operations at the steps #205 and #206 correspond to the operations under the correcting link mode.

Figure 6:
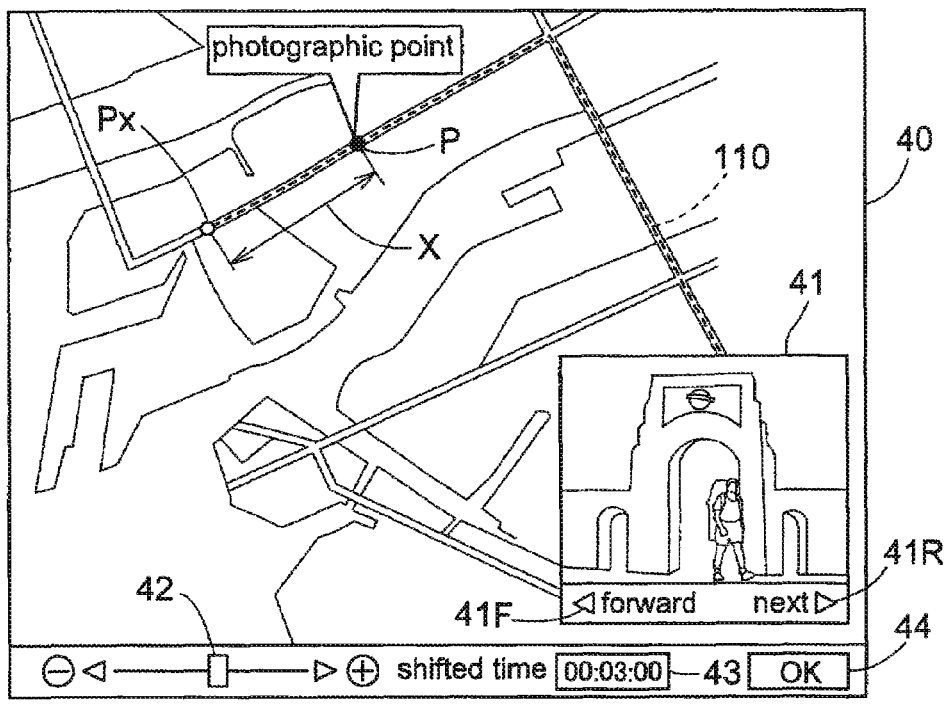
FIG. 6 is a view showing display contents when date data correction is to be effected based on a photographic point and an actual photographic point in a confirming screen relating to the first embodiment.

The operation at step #202 is realized by displaying a confirming screen 40 on the display unit C as shown in FIG. 6. Namely, in this confirming screen, there are displayed the map data, the route 110 on the map data, the photographic points P as "link positions" and the photographic image data correlated with the photographic points P via the link data in the displaying area 41, Under the above-described display condition, if the operator finds that the actual photographic point Px where that photographic image data was obtained is offset by a distance X. Then, the operator will operates a time setting slider 42 also shown in the screen, so that the photographic point P may be shifted on the route 110 to agree with the actual photographic point Px. And, also the photographic date data will be shifted by a time period corresponding to the amount of this shifting of the photographic point P and this shifted time will be displayed at a shifted time displaying section 43.

More particularly, the position data have been acquired at relatively short intervals (more than several times in a minute) and the timing data have been acquired also together with the position data. Therefore, even if the correct photographic date has been set by shifting the photographic date data, it is still possible to readily extract timing data agreeing with or similar to that correct photographic date. And, also the correlation of the photographic image data with the correct photographic date set therein with the position data having the extracted timing data can also be effected easily. As a result, it is possible to display the photographic image data in correlation with the appropriate photographic point on the route 110.

Further, in the figure, the displaying area 41 is shown as a small area on the map data. However, if desired, this displaying area 41 can be formed large to the limit of the screen and the map data can be displayed in the form of a window opened at a portion of such large displaying area 41. Namely, in the present invention, the displaying modes and sizes of the map data and the photographic image data to be displayed on a screen can be freely set.

Also, if necessary, by operating a button 41F, 41R provided at a lower portion of the displaying area 41, the image data can be switched so as to allow the user to confirm the photographic point P in a plurality of photographic image data. After this confirmation, by operating the OK button 44, the correction of the photographic date data of all the photographic image data obtained by the digital camera 105 is completed.

Further, this navigation system is capable also of acquiring and processing photographic image data obtained by a plurality of digital cameras 105. Namely, when the system has acquired photographic image data obtained by a plurality of digital cameras 105, the system effects an operation for shifting photographic date extracted from Exif data annexed to the photographic image data obtained by the respective digital cameras 105 for each camera 106, so that the photographic date data for the photographic image data of any one of the digital cameras 105 can be corrected at one time to generate high precision link data.

Incidentally, in the case of the operation illustrated in the flowchart of FIG. 12, in order to correct an error, the operator confirms the photographic point P and the actual photographic point Px on the map. Instead, the system can be adapted for allowing the shifted time to be inputted manually. Incidentally, the link data has a simple data construction in which the position data (latitude and longitude data) are recorded in correlation with the file number of the photographic image data.

Next, though not shown, in the operation at step #03, the display unit C displays a virtual "keyboard" for allowing a user's finger touching operation thereon, so that character information can be inputted for setting a title and a list of titles of stored music information is displayed on the display unit C. If needed, after sample listening, the user can select, from this list, a title of the music information by finger touching operation to be set as the BGM (background music), so that this selected music is set as the BGM.

Also, in the operation at step #04, in the hard disc HD, the position data, the photographic image data, the link data and the titles are stored and the music selected in the manner described above is also stored in correlation with this electronic album.

Figure 13:
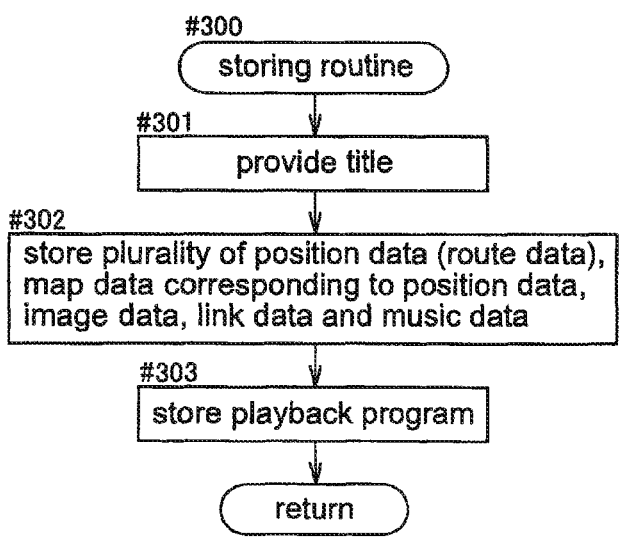
FIG. 13 is a flowchart illustrating a storing operation routine relating to the first embodiment.

The storing operation effected at step #300 is illustrated in the flowchart of FIG. 13. That is, in this storing operation, in the disc medium Md such as a DVD-R as the storage medium, there are stored the title, the plurality of position data (can be considered as route data), map data corresponding to the route data, the photographic image data, the link data and the music data as well as a playback (reproduction) program (steps #301 through #303).

Figure 14:
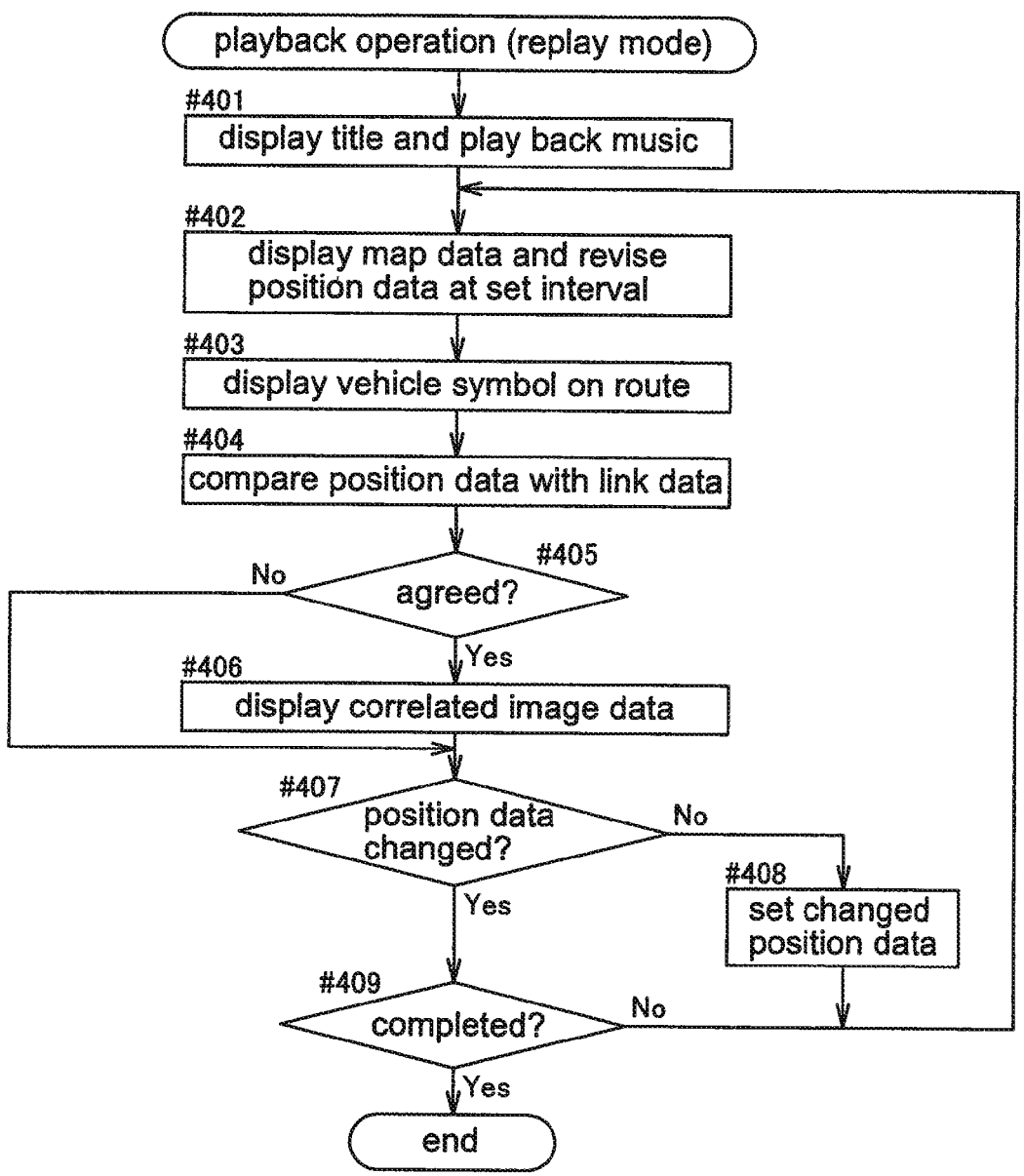
FIG. 14 is a flowchart illustrating a playback operation in the playback mode relating to the first embodiment.

After completion of the series of storing operations described above, the display unit C displays the operation menu 30. If the user operates the playback button 32 in the playback mode in this operation menu 30, as shown in FIG. 7, a playback screen 50 is displayed and also the system executes an operation illustrated in the flowchart of FIG. 14. Upon initiation of this operation, the display unit C displays the title and plays the music and displays also the map data. Further, with the position data being revised and designated along the time base at the set interval, the vehicle symbol 11 will be displayed at a position corresponding to each revised position data on the route 110 (steps #401 through #403).

As the vehicle symbol 111 is displayed at a position corresponding to each position data revised at the predetermined interval on the route 110, the vehicle symbol 111 is displayed as being moved along the route 110 (simulated display).

Next, by comparing the position data with the link data, the system determines presence/absence of correlated position data, if it is found that matching link data is present, then, the photographic image data correlated with that position data is displayed in the displaying area (steps #404 through #406).

In the display of the photographic image data described above, in many cases, a plurality of photographic data were obtained at a same photographic point. In such case, the revision of the position data will be suspended until completion of display of all the photographic image data correlated with that position data.

In the present embodiment, it is contemplated that the photographic points are displayed as dot-like symbols on the route 110. However, the system can eliminate display of such symbol or can display the photographic image data in the form of thumbnail on the route 110.

Further, in the playback screen 50, there are shown a controlling button 52 for realizing a playback operation, a forwarding operation, etc and an indicator 53 for indicating the playing condition on a time line. For instance, if the position data has been changed by a forwarding or "rewinding" operation or the operation on the indicator 53, the changed position data will be set, then, the system will continuously effect the operation for displaying the photographic image data until completion of this operation (steps #407, #408, #409). Incidentally, in this playback screen 50, there is also displayed a counter 54 displaying the total number of the photographic image data and the current display unit thereof.

Figure 15:
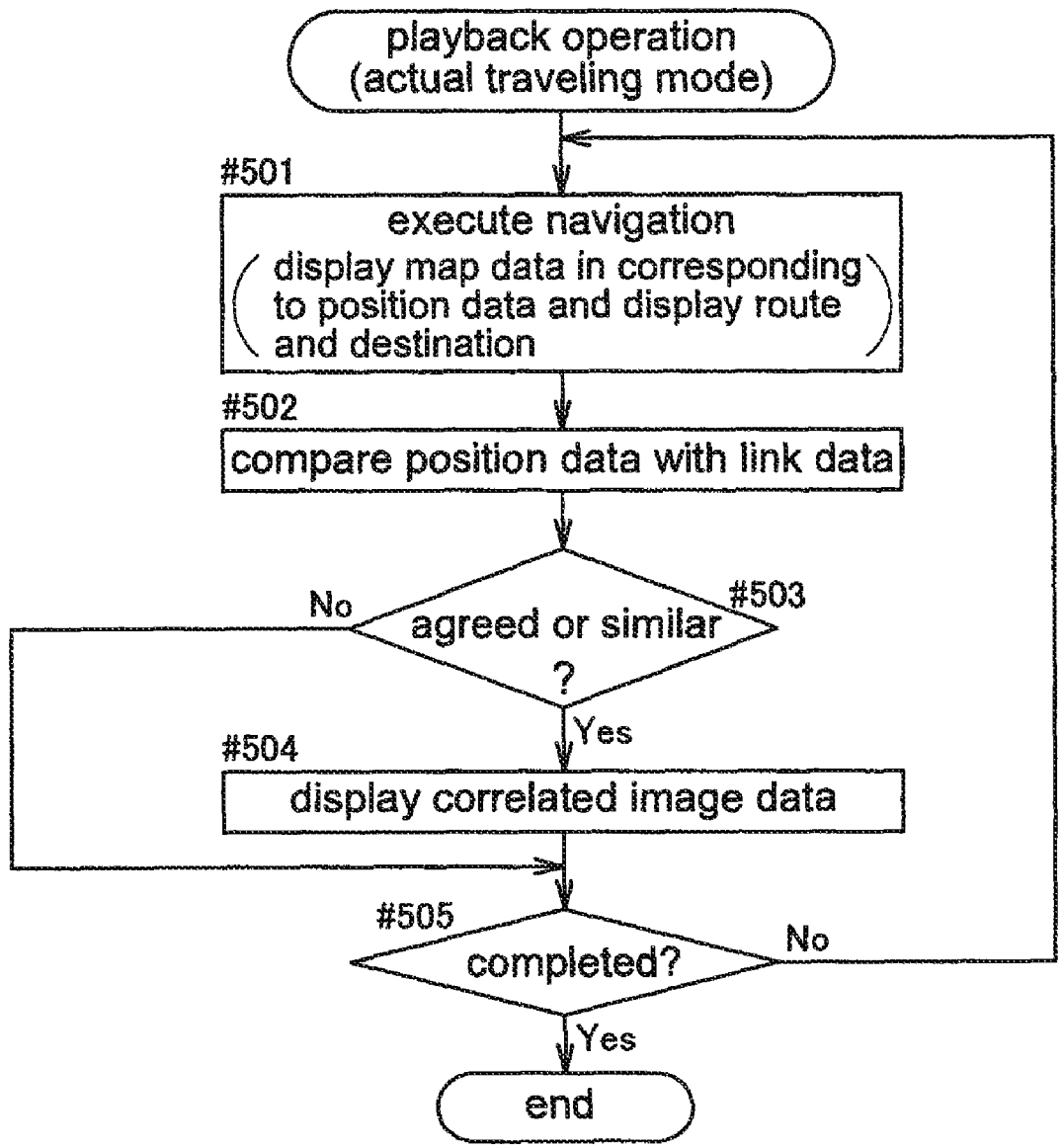
FIG. 15 is a flowchart illustrating a playback operation in the actual traveling mode relating to the first embodiment.

Further, if the user operates the playback button 33 in the actual traveling mode in the operation menu 30, a playback screen 60 shown in FIG. 8 will be displayed and the operation illustrated in the flowchart of FIG. 15 will be effected.

Namely, the system effects an ordinary navigation operation wherein the display unit C displays the map data corresponding to the position data acquired by the position acquiring means L and displays also the vehicle symbol 111 at a position corresponding to the position data (step #501).

During this navigation, the position data acquired by the position acquiring means is compared with the link data. Then, if there exists matching or similar link data, then, the system continuously effects the operation for displaying the photographic image data correlated with that link data in the displaying area 61 until its completion (steps #502 through #505).

In such operation as above also, it is contemplated that the photographic point P is displayed as a dot-like symbol on the route 110. However, the system can eliminate display of such symbol or can display the photographic image data in the form of thumbnail on the route 110.

Further, if the data were stored in a DVD-R and complied as an electronic album, then, when this DVD-R is set to a personal computer to effect the playback program described above, then, exactly the same playback screen 50 as that in the above-described playback mode will be displayed on the display unit of the personal computer.

That is, by revising the position data at the predetermined interval, the vehicle symbol 111 will be displayed as being moving along the route 110. Further, if there exists link data matching or similar to the position data, the photographic image data correlated with that position data will be displayed in the displaying area 51. In the display of the photographic image data described above, in many cases, a plurality of photographic data were obtained at a same photographic point. In such case, the revision of the position data will be suspended until completion of display of all the photographic image data correlated with that position data.

In the playback screen 50, there are shown the controlling button 52 for realizing a playback operation, a forwarding operation, etc and the indicator 53 for indicating the playing condition on a time line. For instance, if the position data has been changed by a forwarding or "rewinding" operation or the operation on the indicator 53, the changed position data will be set, then, the system will continuously effect the operation for displaying the photographic image data until completion of this operation, and the user can grasp the number of displayed photographic image data on the counter 54.

As described above, according to the present invention, when photographic image data obtained by a digital camera 105 is to stored in correlation with position data acquired by e.g. a car navigation system, the system obtains the timing data of the acquisition of the position data and the photographic date data from the Exif data annexed to the photographic image data and these data, i.e. the timing data and the photographic data, are correlated with each other via the link data. With this, without the trouble of e.g. displaying the position data and the photographic image data on a monitor screen and then effecting editing thereof under this condition, it is possible to correlate a plurality of photographic image data with a plurality of position data at one time in a convenient manner.

Especially, photographic image data obtained by a standard digital camera 105 usually includes Exif data. If the position acquiring means is the GPS type, time data is required for acquisition of position. Hence, it is readily possible to store such position data together with the timing data. Then, the correlating operation can be effected in a relatively simple manner as an operation for comparing the respective time data and correlating matching or similar ones.

Further, it is usually assumed that the time of the clock incorporated in the digital camera 105 can have a relatively large difference or error relative to the actual time. In such case, since the photographic date data extracted form the Exif data of the photographic image data obtained by that digital camera 105 have a same amount of such difference or error in the photographic date(s) of all the photographic image data, then, after correction of error in the photographic date data of photographic image data to be correlated with one position data, the photographic date data of all the other photographic image data obtained by that digital camera 105 will be shifted by the same amount as that error, whereby the photographic date data of all of the photographic image data can be corrected also, thereby to allow high precision correlation.

Second Embodiment

Aside from the foregoing embodiment, the present invention may be embodied also as described below (in the following discussion of this second embodiment, elements or components having same functions as those in the foregoing embodiment will be denoted with the same reference numerals or marks as employed in the foregoing embodiment)

Figure 16:
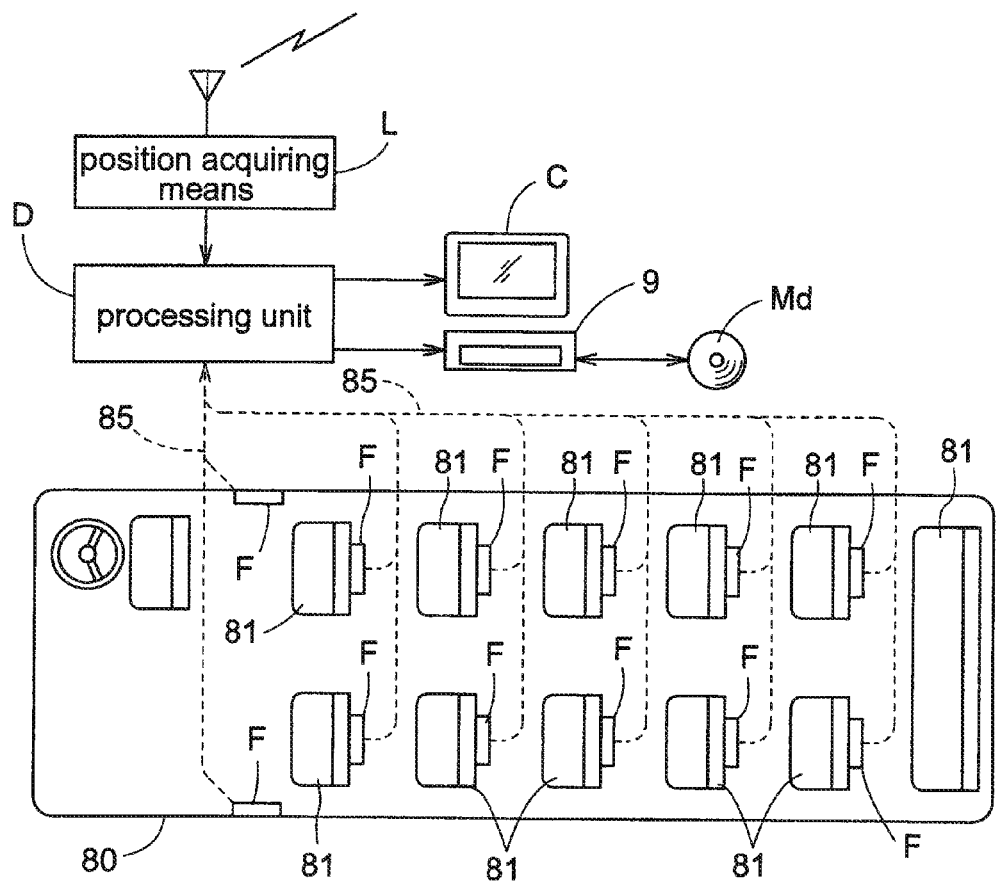
FIG. 16 is a block diagram showing construction of a second embodiment.
Figure 17:
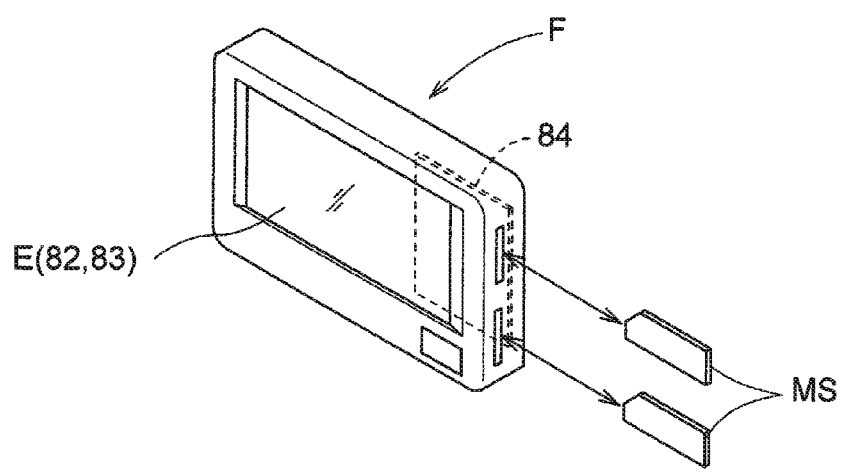
FIG. 17 is a perspective view showing input terminals relating to the second embodiment.

As shown in FIG. 16, in e.g. a sightseeing bus having many passenger's seats 81 inside a vehicle body 80, adjacent each seat 81, there are provided a display unit E consisting of a liquid crystal display section 82 and a touch panel section 83 as shown in FIG. 17 and an input terminal F (an example of image data acquiring means) having a semiconductor drive 84. And, the respective input terminals F are connected to a processing unit D via a communicating passage 85 for allowing data access to the respective input terminals F.

This processing unit D inputs position data from the position acquiring means L acquiring position data in realtime by reception of signals from a GPS satellite and causes the display unit C to display processing information and controls the disc drive 9. Incidentally, in this embodiment, it is assumed that the operation via the display unit C of the processing unit D is carried out by a predetermined person such as a sightseeing tour attendant.

In the input terminal F, when the semiconductor medium Ms storing therein photographic image data obtained by a digital camera is set to the semiconductor drive 84, like the operation described hereinbefore in the first embodiment with reference to the flowchart of FIG. 11, the display unit E displays a selecting screen for requesting selection of data to be stored. Then, photographic image data selected by an operator (passenger) is transmitted via the communicating path 85 to the processing unit D to be stored therein.

Further, in the processing unit D, when storing the photographic image data, the unit identifies the terminal F and specifies the digital camera based on the data of the name of the manufacturer of the camera, the type of the camera included in the Exif data annexed to the photographic image data and the file number also annexed to the photographic image data and then stores this photographic image data obtained by that digital camera in an identifiable format and as sorted in a group.

In storing the photographic image data as described above, there is effected the operation for correlating timing data indicative of the timing of the acquisition of position data and the photographic date data included in the Exif data which agree with or are similar to each other, via link data. Also, in this second embodiment too, the correction of the photographic data for each group can be effected by the operator's correction of the photographic date data or an attendant's confirmation of the contents of the photographic image data.

In this second embodiment, the construction of the processing unit D is basically same as that described in the foregoing embodiment, and, the basic mode of the operation for making an electronic album is also same as the operation described hereinbefore in the first embodiment with reference to the flowchart of FIG. 13. In this second embodiment, it is contemplated that at the end of the tour (sightseeing tour), the data are stored in a storage medium such as a DVD-R and complied into an electronic album to be given to each passenger (tourist). This second embodiment slightly differs from the first embodiment in the mode of the playback in the playback program when the storage medium storing the electronic album therein is set to the personal computer for playback (i.e. reproduction).

Figure 18:
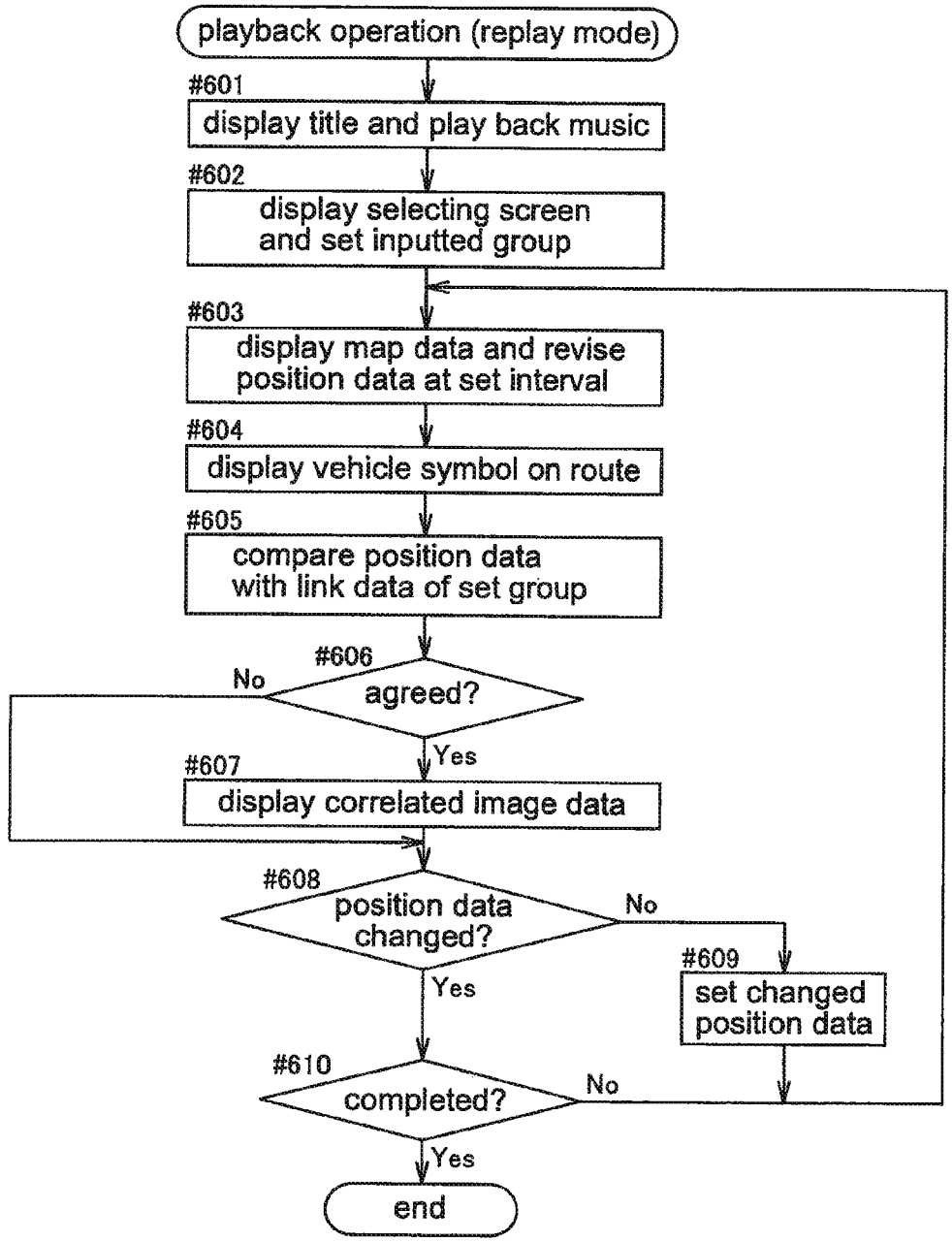
FIG. 18 is a flowchart illustrating a playback operation in the playback mode relating to the second embodiment.

Namely, as illustrated in the flowchart of FIG. 18, upon initiation of the operation, the display unit displays a playback screen 50 shown in FIG. 7, showing the title therein and also music is played. Further, the selecting screen is displayed for displaying a portion of the photographic image data obtained by each digital camera, thus requesting selection by the user (steps #601, #602). This operation for requesting selection is for prompting the user to select an operation for displaying only a group of photographic image data obtained by this user or an operation for displaying all photographic image data (all groups).

After setting of the group described above, the display unit displays map data and the position data is revised by the predetermined interval, whereby the vehicle symbol 111 will be displayed at a position corresponding to each revised position data (steps #603, #604). As the vehicle symbol 111 is displayed at a position corresponding to each position data revised by the predetermined interval, this vehicle symbol 111 is displayed as being moving along the route 110.

Next, by comparing the position data and the link data, presence/absence of correlated position data is determined. If it is found that matching link data exists, then, the system effects the operation for displaying the photographic image data correlated with that position data in the displaying area 51 (steps #605 through #607).

In the display of the photographic image data described above, in many cases, a plurality of photographic data were obtained at a same photographic point. In such case, the revision of the position data will be suspended until completion of display of all the photographic image data correlated with that position data. In the present embodiment, it is contemplated that the photographic points are displayed as dot-like symbols on the route 110. However, the system can eliminate display of such symbol or can display the photographic image data in the form of thumbnail on the route 110.

Further, in the playback screen 50, there are shown the controlling button 52 for realizing a playing operation, a forwarding operation, etc and the indicator 53 for indicating the playback condition on a time line. For instance, if the position data has been changed by a forwarding or "rewinding" operation or the operation on the indicator 53, the changed position data will be set, then, the system will continuously effect the operation for displaying the photographic image data until completion of this operation (steps #608, #609, #610). Incidentally, in this playback screen 50, there is also displayed the counter 54 displaying the total number of the photographic image data and the current display unit thereof.

In this second embodiment, even when many passengers using different digital cameras 105 took landscape photos and/or snap photos at a same sightseeing spot as is the case with a sightseeing bus group tour, it is possible to store the photographic image data obtained at a same time with automatic correlation with the same photographic point (position data). Therefore, if such photographic image data correlated with the map data are stored in a storage medium such as a DVD-R and given to each passenger, the passenger (tourist) can play it later on a personal computer in his/her home and enjoy the electronic album. In doing this, the user can enjoy the photographic image data obtained by a plurality of passengers or enjoy selectively only the photographic image data obtained by a certain person (passenger).

Other Embodiments Relating to First and Second Embodiments

The present invention may be embodied alternatively as follows.

(a) If a user took photos with a digital camera when re-visiting a photographic point P once visited before, the processing mode of the system can be adapted such that the photographic image data are stored as addition to the previously set photographic point or the photographic image data obtained previously are stored as addition to the photographic point P on the route of the re-visiting occasion. When such operation mode is to be effected, this can be realized only by changing the mode of operation effected by the link processing means 15 for data correlation. When the photographic image data is reproduced, this can be done such that the user can enjoy the previous photographic image data and the new photographic image data in combination.

(b) In the foregoing embodiments, when the display unit C displays the photographic image data, the image data are displayed with the map data as the background. Instead, the display unit C may display the photographic image data on the entire screen thereof, with displaying the map data at a portion of this photographic image data.

(c) The map data used in playing back the electronic album is not limited to the data of details of the area or the schematic data such as a simple illustration or sightseeing map, but can also be data showing the route traveled by the vehicle as a simple figure such as an S-shaped route. Further, when the map data comprise simple schematic route data showing only those roads corresponding to the route, such route need not necessarily match perfectly the route actually traveled by the vehicle. Such data can be just enough to allow the user to recognize the route traveled by the vehicle as a whole. Especially, when the position data constituting this route is to be correlated with the image data, no strict or exact correlation between the photographic point and the position data is needed.

Third Embodiment

The present invention may be embodied alternatively by utilizing the hardware described in the first embodiment and shown in FIGS. 1 and 2.

Figure 19:
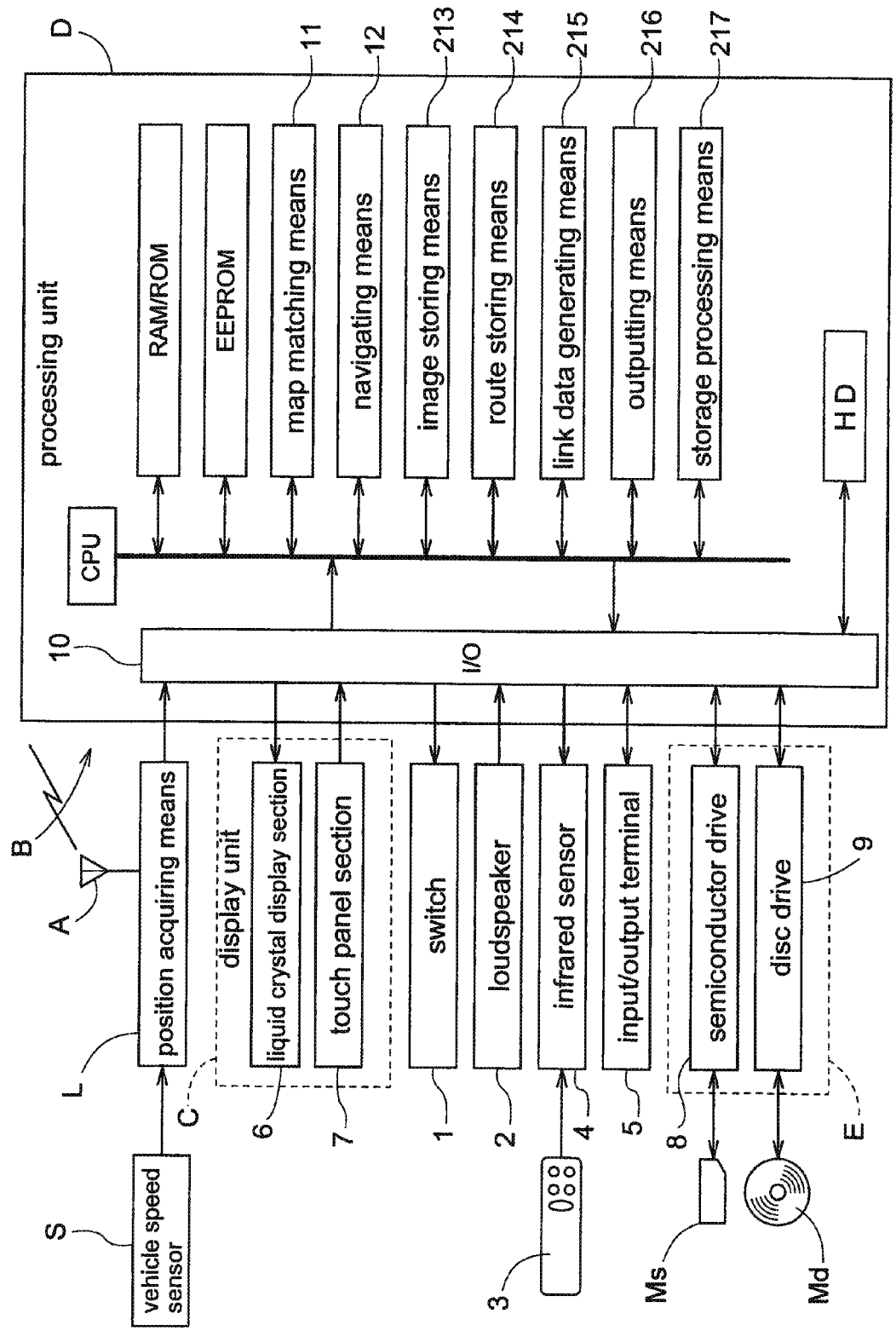
FIG. 19 is a circuit block diagram of a navigation system according to a third embodiment.

Namely, the navigation system can be constructed as shown in FIG. 19.

In this system, the system body B includes an input/output interface 10 for realizing access of information to a microprocessor. To this input/output interface 10, there is provided a signal system for allowing data access from a position acquiring means L, the liquid crystal display section 6, the touch panel section 7, the plurality of switches 1, the loudspeaker 2, the infrared sensor 4, the input/output terminal 5, the semiconductor drive 8, the disc drive 9, the hard disc HD, respectively.

The position acquiring means L is operable to acquire an electromagnetic wave received by the antenna unit A from a GPS satellite and also to acquire vehicle position data (longitude and latitude data) by inputting the vehicle speed pulse signals from the vehicle speed sensor S in realtime.

The hard disc HD acts as first storing means for storing the photographic image data in a group for each destination and acts also as a second storing means for storing route data. These storage processing means i.e. the first storing means and the second storing means need not be independent hardware structures, but can also be e.g. different files stored in the hard disc HD or can be realized as semiconductor memory.

Moreover, this hard disc HD acts as a map database as a map storing section for storing map data and as a music database for storing music data. The destination can be set after the vehicle has traveled, rather than before the vehicle starts traveling.

The processing unit D includes the following components connected to the data bus from the microprocessor, i.e. a semiconductor memory RAM/ROM, a nonvolatile memory EEPROM, a map matching means 11, a navigating means 12, an image storing means 213, a route storing means 214, a link data generating means 215, an outputting means 216 and a storage processing means 217. Incidentally, in order to realize various control operations in this processing unit D, in addition to the data bus, control buses, address busses, etc are also needed. In order to avoid complexity of the illustration, in the figure, such control busses, address busses, or interfaces, etc. are not illustrated.

The map matching means 11 is configured for extracting map data corresponding to the position data acquired by the position acquiring means L from a map database stored in the hard disc HD and causing the display unit C to display the data with a predetermined enlargement scale. The navigating means 12 is configured for extracting a predetermined route to a destination from the map data and causing the display unit C to display the route in the form of a line on the map data and display also necessary operations such as a right turn or a left turn each point such as an intersection and causing also the loudspeaker 2 to output such necessary operation as a right turn or a left turn in the form of human voice language.

Figure 21:
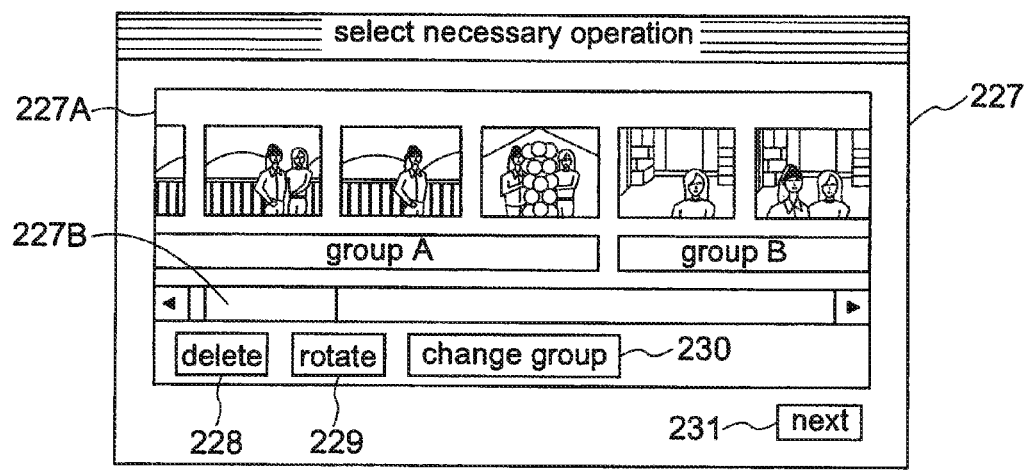
FIG. 21 is a view showing an image acquiring screen relating to the third embodiment.

The image storing means 213 is configured for storing the image data acquired via the semiconductor drive 8, the disc drive 9 or the input/output terminal 5 to the hard disc HD (an example of "first storing means"). When this image storing means 213 stores a plurality of image data in the hard disc HD, as shown in FIG. 21, the display unit C displays a screen for allowing input of the image data and as a user carries out an operation following the display of this screen, the plurality of image data will be sorted in groups for respective destination and stored in independent files (this storing operation will be detailed later).

Figure 25:
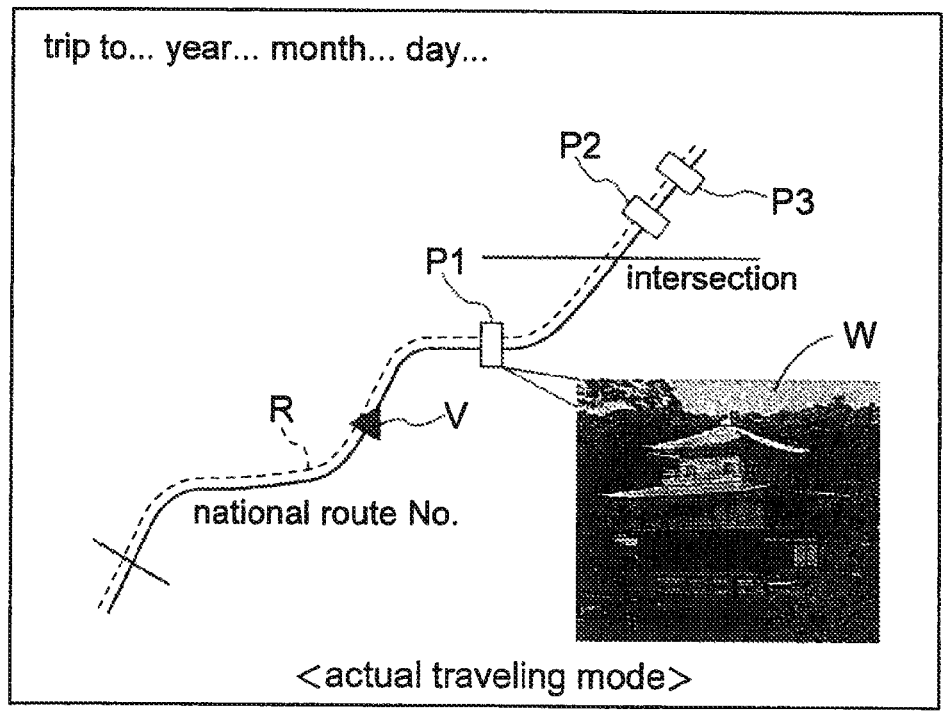
FIG. 25 is a view showing display contents of an actual traveling mode relating to the third embodiment.
Figure 31:
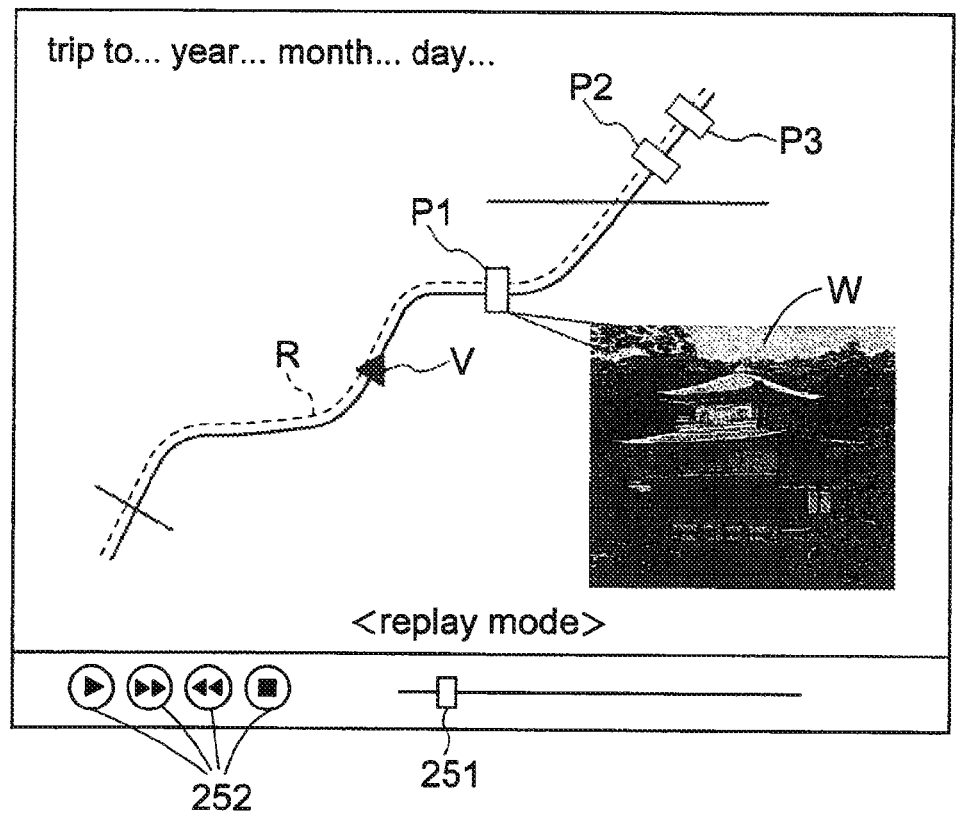
FIG. 31 is a view showing display contents of a replay mode screen relating to the third embodiment.

The route storing means 214 stores route data R (see FIGS. 25 and 31) corresponding to the route traveled by the vehicle in the hard disc HD (an example of "second storing means"). In this embodiment, it is contemplated that this route data R has a data construction storing data indicative of the coordinates of the vehicle at respective sampling timings. Instead, the data can have a different construction wherein a plurality of coordinates as reference points and traveling direction and traveling speed of the vehicle set for each coordinate are provided in the form of vector data. Further, when this route data R stored by this route storing means 214 is displayed on the display unit C, this is done as indicated by broken lines in FIG. 25 and FIG. 31. As shown, on this route 11, there is shown the vehicle symbol V and on this route data R, there is also shown a destination P (generic concept of a plurality of destinations P1, P2, P3 . . . . )

Figure 22:
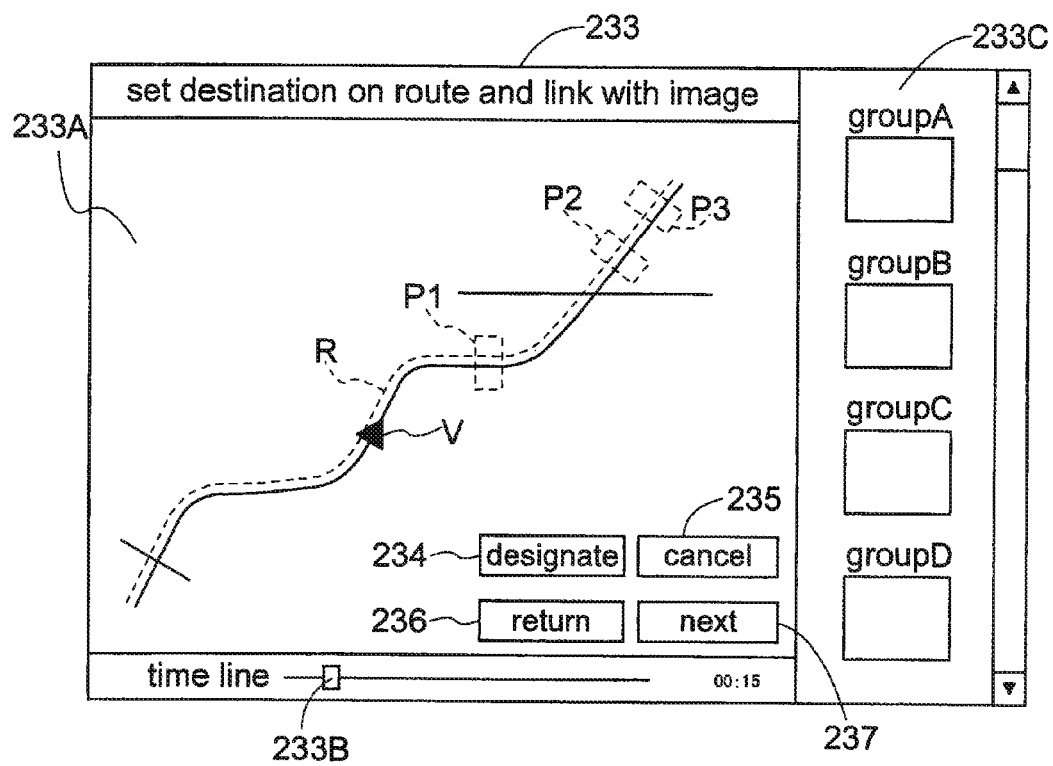
FIG. 22 is a view showing a link editing screen relating to the third embodiment.

The link data generating means 215 effects correlation of image data with each destination P set on the route data R while a link editing screen 33 shown in FIG. 22 is being displayed on the display unit C and the stores the generated link data in the form of a file, so that the image data may be displayed according to the order of their storage. The outputting means 216 displays, on the display unit C, the image data correlated with the route data R, as will be detailed later.

Further, the storage processing means 217 is configured for storing, in a storage medium such as the disc medium Md., the selected route data R, a plurality of image data correlated with that route data R, and a map data corresponding to the route data, correlated music data if any and an outputting means 216 constructed as a program (mode of control of this operation will be described later).

In this embodiment, it is contemplated that the map matching means 11, the navigating means 12, the image storing means 213, the route storing means 214, the link data generating means 215 and the outputting means 216 are all realized in the form of software (programs) which can be stored in the semiconductor memory RAM. Instead, some or all of these can be realized as hardware such as a wired-logic.

The route storing means 214 is configured to constantly store the route data R of the route traveled by the vehicle. For instance, if it is desired to correlate e.g. snap photos obtained by a digital camera Cam with the route after a trip, when the user returns home after the trip, the display unit C displays an operation menu 220 shown in FIG. 20, then, the user operates an "image acquisition" button 221. Incidentally, this operation menu 220 displays, in addition to the "image acquisition" button 221, a "playback operation (actual traveling mode)" button 222, a "playback operation (replay mode)" button 223, a "medium storage" button 224, and an "OK" button 225.

Figure 26:
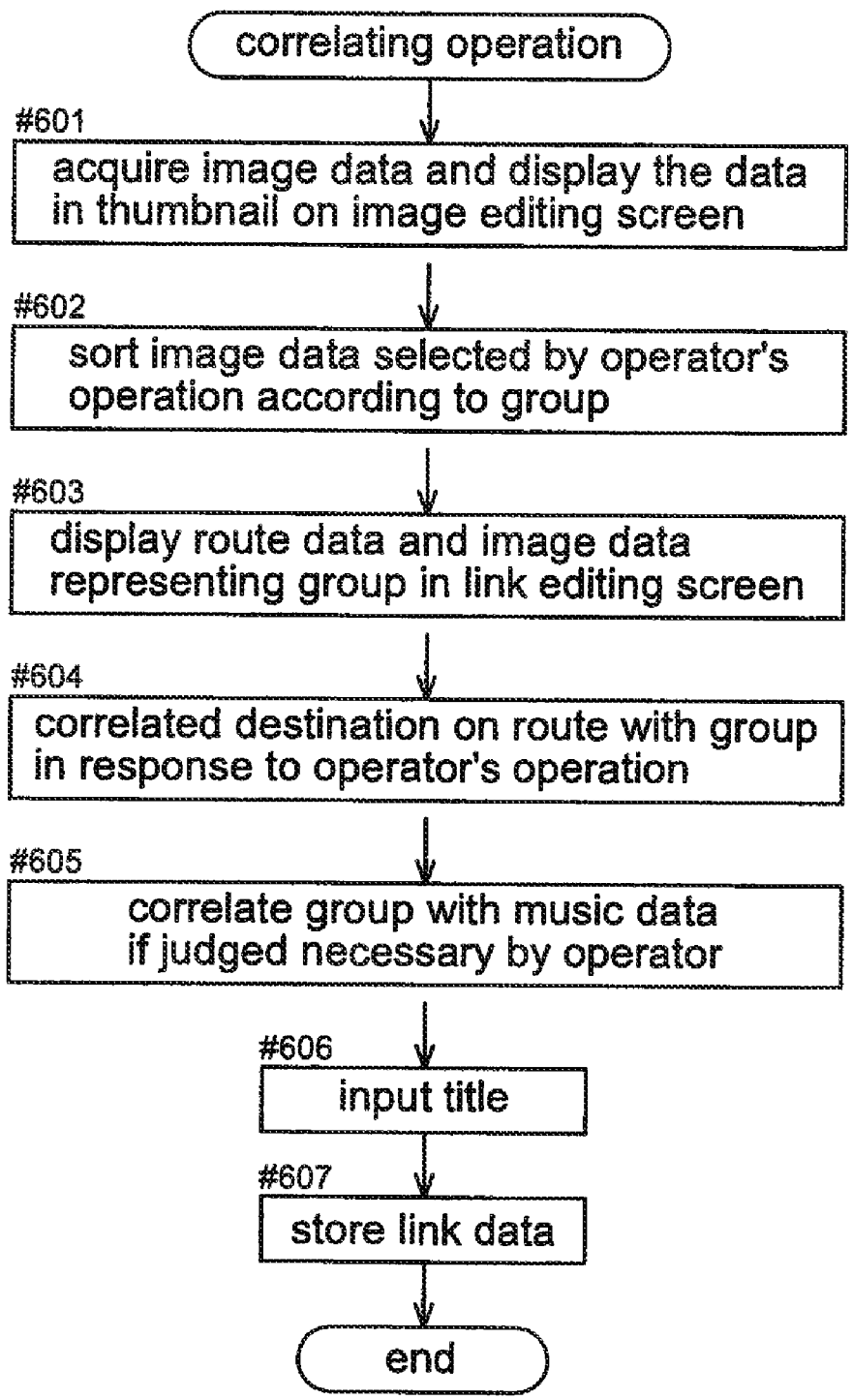
FIG. 26 is a flowchart of a correlating operation relating to the third embodiment.

If the user operates the "image acquisition" button 221 and then operates the "OK" button 225, first, the correlation illustrated in the flowchart of FIG. 26 is executed.

In this correlating operation, the plurality of image data acquired via e.g. the semiconductor drive 8 are displayed in an image acquiring screen 227 (step #601).

In this image acquiring screen 227, all the acquired image data are displayed in an image displaying area 227A in the thumbnail format. And, by operating a scroll bar 227, the user can confirm all the image data. Also, by selecting image data being displaced and then operating a "deletion" button 228, any unnecessary image data in the acquired image data can be deleted.

If the "rotation" button 229 is operated, the image data is rotated by 90 degrees. After selection of image data, if the "group change" button 230 is operated, the image data is included in a desired group (step #602). Incidentally, when image data is selected on this image acquiring screen 227, the user effects such operation as touching his/her finger to the portion of the image data displayed on the display unit C for acquiring the position or moving the cursor by means of the remote controller 3.

The route storing means 214 is configured to constantly store the route data R of the route traveled by the vehicle. Also, by operating the "image data acquisition" button 221, the timing of storing image data can be set during traveling of the vehicle. Alternatively, this setting may be effected after the vehicle returns home. Incidentally, in this type of operation for constantly storing the route data traveled by the vehicle, it is necessary to delete unnecessary route data when the route data has been stored in an amount near the capacity of the storage area. Hence, the operation mode may be set so that route data stored in old storage area or seeming unnecessary route data are automatically extracted and displayed on the display unit C for requesting decision of its deletion or not.

The image data to be displayed in the image displaying area 227A are displayed according to the order of their photographic operations by the digital camera Cam. Therefore, when the image data are sorted into groups, this can be done conveniently by simply sorting the image data displayed in this image displaying area 227A one after another. Upon completion of this grouping operation, by operating the "next" button 231, the process moves on to the next operation.

In the next operation, the display unit C displays an link editing screen 233 shown in FIG. 5 (step #603). In this link editing screen 233, the route data R traveled by the vehicle symbol V is displayed together with the map data in the map data displaying area 233A. At a lower portion of this map displaying area 233A, there is displayed a time line control bar 233B for reproducing the vehicle run. Also, in a group displaying area 233C, an image data representative of the plurality of image data sorted in a group is displayed. Further, in the map displaying area 233A, there are displayed a "designation" button 234, a "cancellation" button 235 for canceling designation, a "return" button 236 and a "next" button 237.

When this link editing screen 233 is displayed, the operator sets a desired position of the route data R as a destination P and designates a group to be correlated with this destination P (step #104). This operation can be conveniently done as an operation using the touch panel section 7 of the display unit C. Instead, however, the remote controller can be used. After this correlation, by operating the "next" button 237, the process moves on to the next operation.

Figure 23:
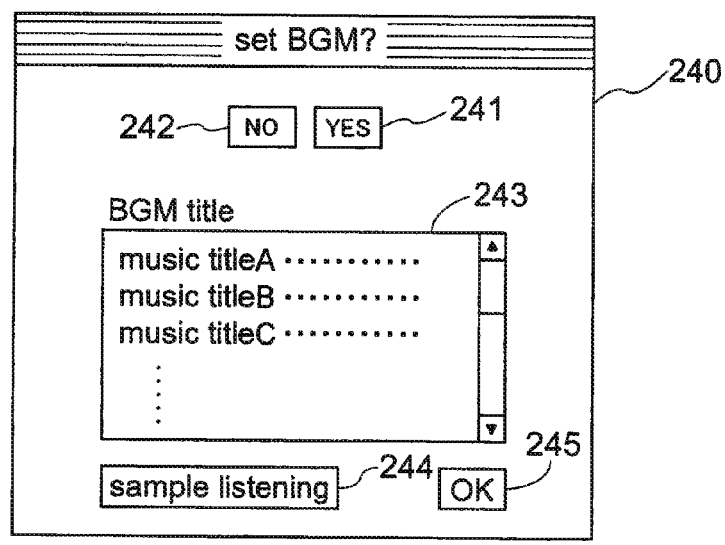
FIG. 23 is a view showing a BGM setting screen relating to the third embodiment.

In the next operation, the display unit C displays a BGM set screen 240 shown in FIG. 23. Then, if the operator decides it is needed, the operator will operate a "YES" button 241. Whereas, if the operator decides it is not needed, the operator operates a "NO" button 242.

When the "YES" button 241 is operated, music tiles stored in the music database are list-displayed in a music title displaying section 243. For sample listening, by operating a "sample listening" button 244, a music piece can be sample-listened on the loudspeaker 2. After selection of the music, if the "OK" button 245 is operated, this music data is set as BGM for one route data and then the process moves on to the next operation (step #605). Incidentally, for the setting of the music data, the system may be adapted such that different music is set for each group.

In the next operation, the display unit C displays a title inputting screen (not shown). Then inputting necessary characters forming the title with using a keyboard displayed on this title inputting screen, the operation is completed (step #606).

Figures 27, 28:
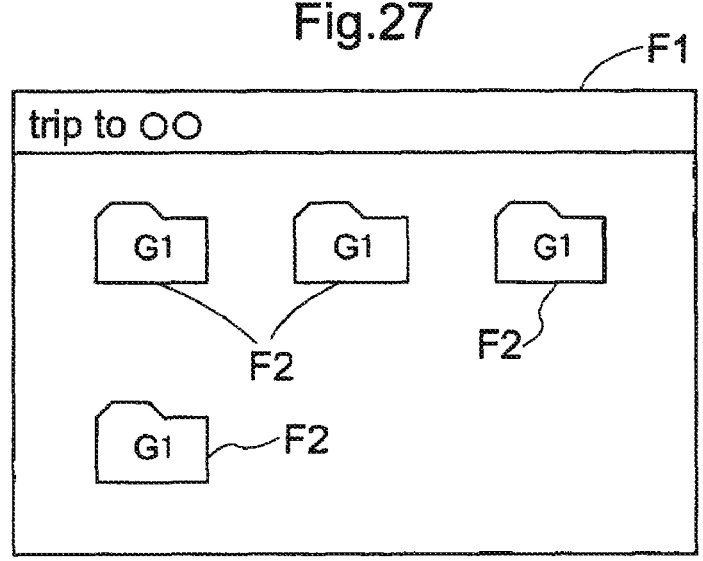
FIG. 27 is a view showing a mode of storing images sorted in groups relating to the third embodiment.
FIG. 28 is a view showing construction of link data relating to the third embodiment.

FIG. 27 shows an exemplary mode of storage of the image data after completion of the correlating operation described above. In this example, for a folder F1 provided with a title, there are provided a plurality of folders F2 (e.g. shown at G1, G2, G3 . . . in the figure) provided with ID information of the group G. Further, the link data generating means 215 generates link data as shown in FIG. 28. In this link data, within an area which can be specified by the title, a code number for specifying music data and a group of information indicative of the relationship between the group G and the destination P are stored in the text format, CSV format, etc.

After the sorting of the plurality of image data in groups and correlating each group with the destination P set on the route data R in the manners described above, the system can selectively provide an actual traveling mode display for displaying the image data on the display unit C during an actual traveling of the vehicle or a replay mode display for displaying image data, when desired, on the display unit C while the vehicle is kept still (i.e. stopped).

Figure 20:
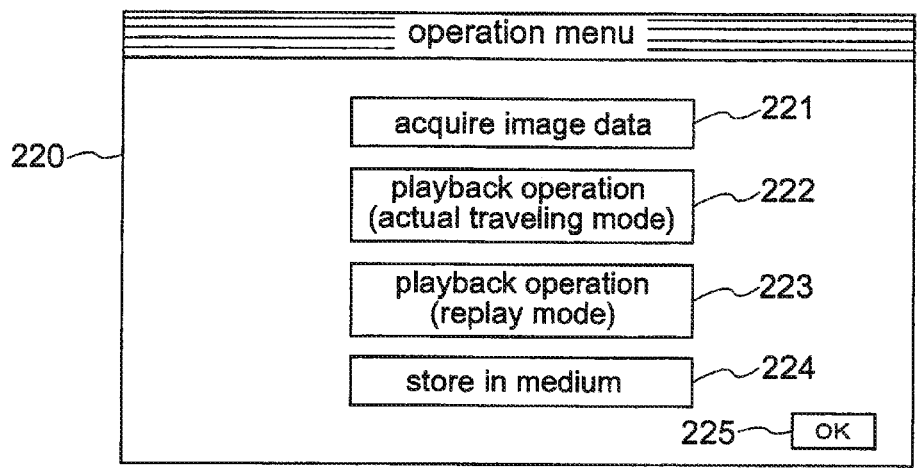
FIG. 20 is a view showing an operation menu relating to the third embodiment.
Figure 29:
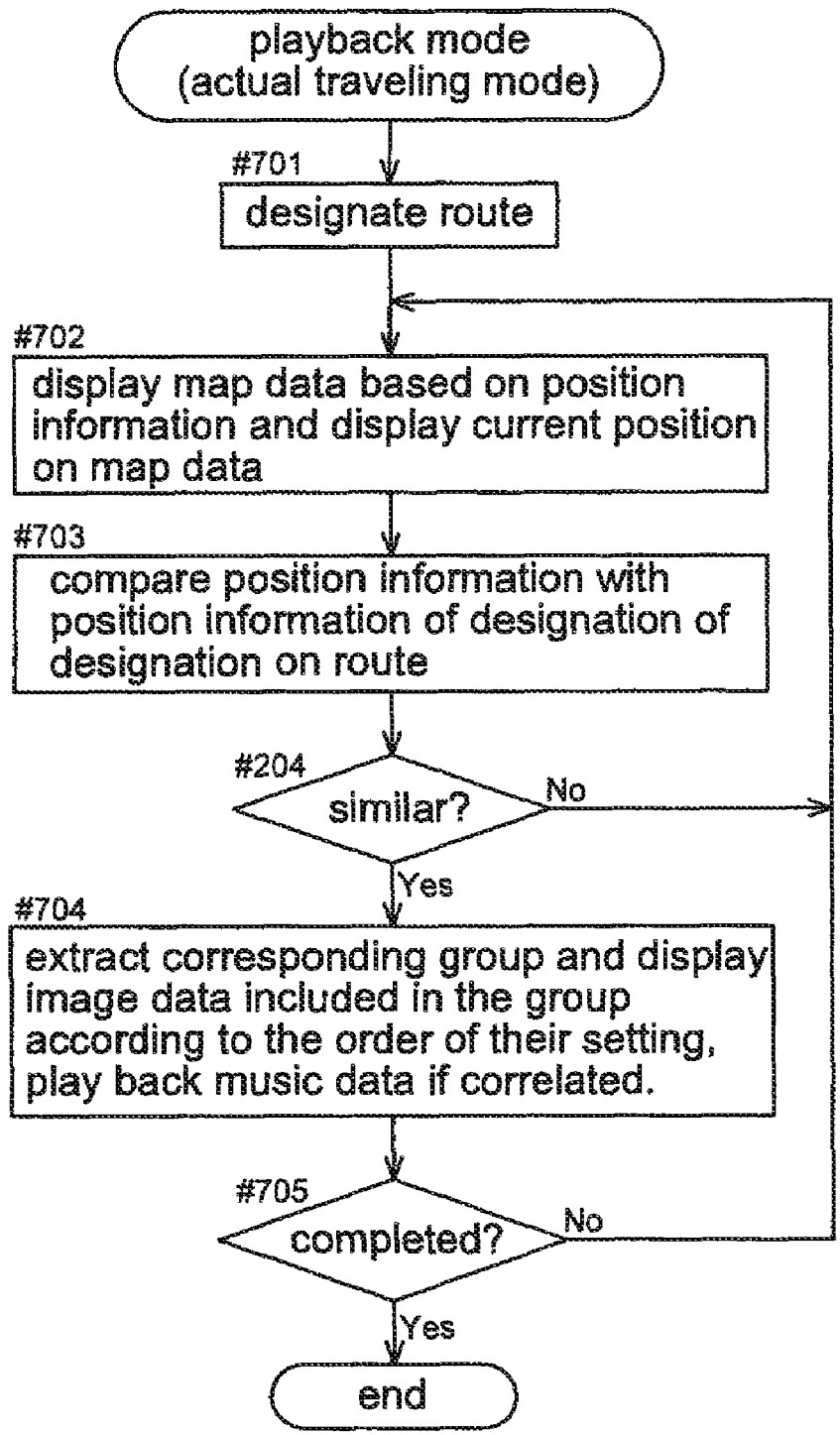
FIG. 29 is a flowchart illustrating a playback operation in the actual traveling mode relating to the third embodiment.

That is, as shown in FIG. 20, the display unit C displays the operation menu 220. Then, if a "playback operation (actual traveling mode)" button 222 in the menu 220 is operated, there will be displayed a selecting screen 247 shown in FIG. 24, so that the user can select one to be reproduced from the titles displayed in a list in the displaying section 248 of the selecting screen 247 and by operating the "OK" button 249, route data R corresponding to that title is designated as shown in the flowchart of FIG. 29 (step #701).

After this designation of route data R, the display unit C displays the actual traveling mode screen shown in FIG. 26. In this, the route data R is displayed on the map data. In the other respects, the display contents of the display unit C are same as the standard contents showing the position of the vehicle symbol V (step #702).

Thereafter, when the vehicle symbol V approaches the destination P on the route data R as the result of traveling of the vehicle, a window W is opened or "popped up" in superposition with a portion of the area of the map data, so that the plurality of image data correlated with that destination P will be displayed according to the predetermined order and at set interval and if there exists music data correlated therewith, this music data will be played (steps #703 through #705).

And, this operation can be canceled by the operator's operating any switch or the like (step #706).

Figure 24:
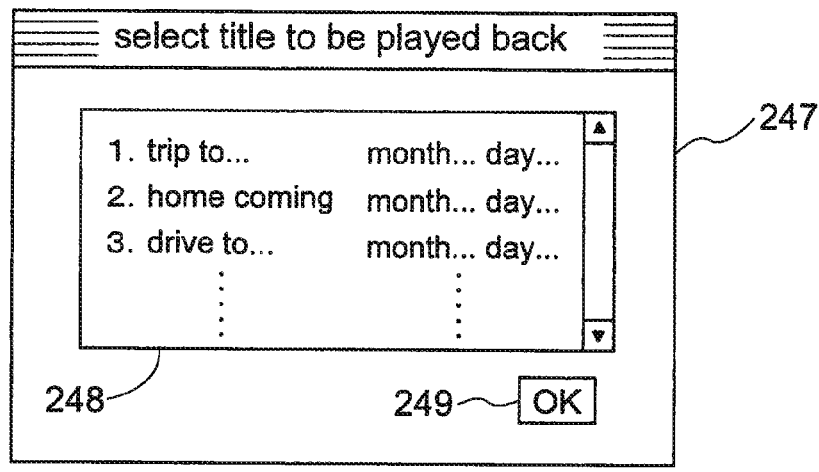
FIG. 24 is a view showing a selecting screen relating to the third embodiment.
Figure 30:
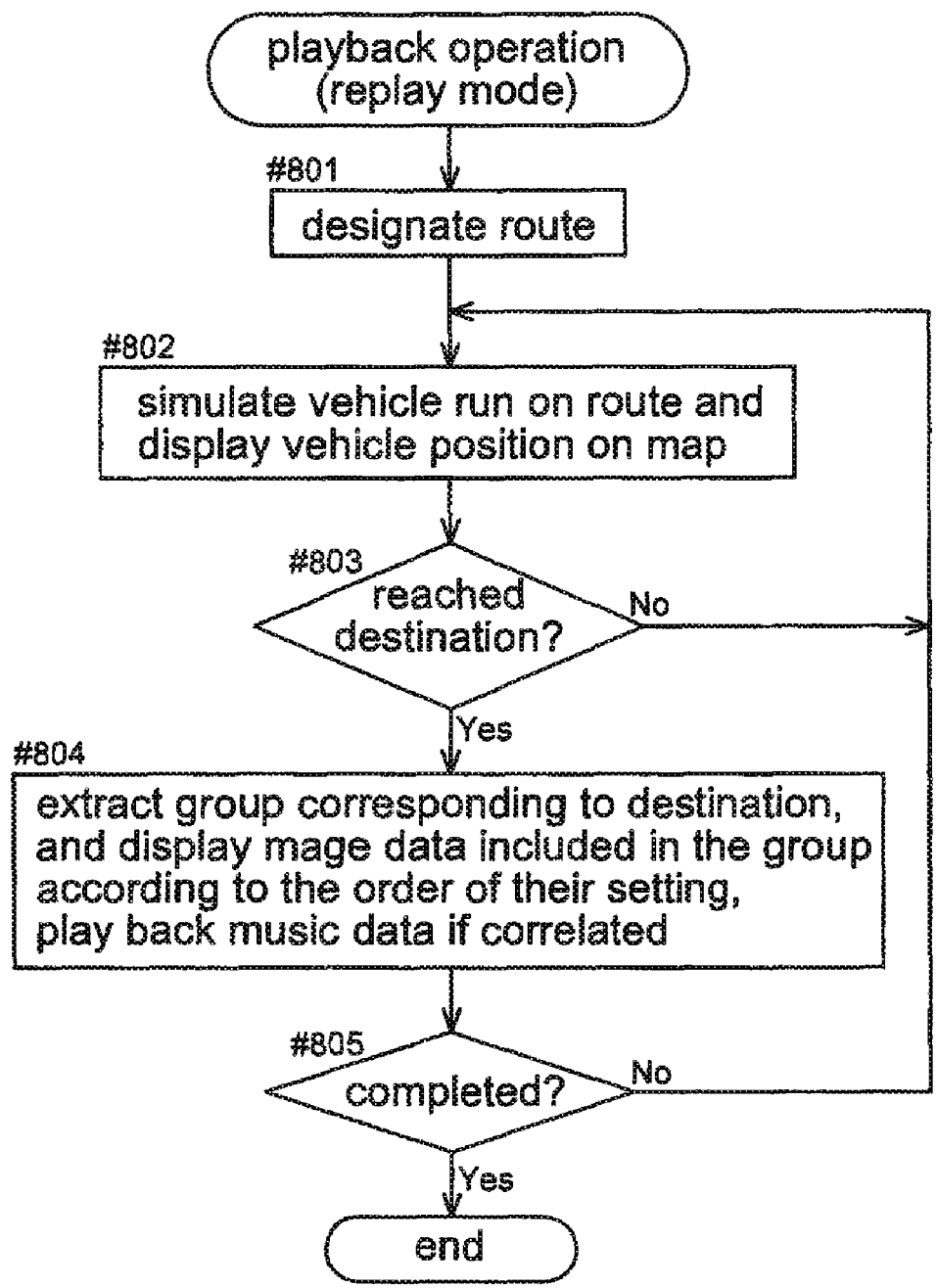
FIG. 30 is a flowchart illustrating a playback operation in a replay mode relating to the third embodiment.

Further, if the "playback operation (replay mode)" button 23 in the operation menu 220 displayed on the display unit C is operated, like the case described above, there is displayed the selecting screen 247 shown in FIG. 24, so that the user can select one to be reproduced from the titles displayed in a list in the displaying section 248 of the selecting screen 247 and by operating the "OK" button 49, route data R corresponding to that title is designated as shown in the flowchart of FIG. 30 (step #801). And, the display unit C displays the replay mode screen shown in FIG. 31.

In this replay screen, there are shown a time line bar 251 and a plurality of playback controlling buttons 252. Then, by operating one of the playback controlling switches 252 or the time line bar 251, the movement of the vehicle symbol V on the route data R will be displayed in time shortened manner (quickened in simulation) and when the vehicle symbol V reaches the destination P, a window W is popped up in superposition with a portion of the area of the map data, so that the plurality of image data correlated with that destination P will be displayed according to the predetermined order (steps #802 through #804). And, this operation can be canceled by the operator's operating any switch or the like (step #805).

That is to say, when the actual traveling mode is selected, when the vehicle approaches the destination P set on the route data R, the image data correlated with that destination P are displayed on the monitor unit C, so that the driver and/or passengers can enjoy the image data obtained at the previously visited destination P.

In this case, the vehicle need not travel on the route data R. Rather, the plurality of image data can be automatically displayed each time the vehicle approaches the destination P. Further, when the replay mode is selected, while the vehicle is not traveling, i.e. parked or stopped, the route data P will be displayed for the map data displayed on the display unit C and the vehicle symbol V will be displayed as moving along the route R. Then, when the vehicle symbol V approaches the destination P, the plurality of image data can be automatically displayed. Hence, it is possible to display e.g. photographic data obtained during a trip for each destination.

According to the navigation system of the invention, by correlating the destination P set to the route data R stored in the manner described above with the image data sorted in a group, the automatic display of plurality of image data is made possible. Further, this system has also the function of storing such data in the disc medium Md (an example of "storage medium") such as a DVD-R, CD-R or the like as data executable on a personal general-purpose computer for enabling the replay mode display described above.

That is, if the "medium storage" button 224 in the operation menu 220 is operated, the operation by the storage processing means 217 is executed.

Figure 32:
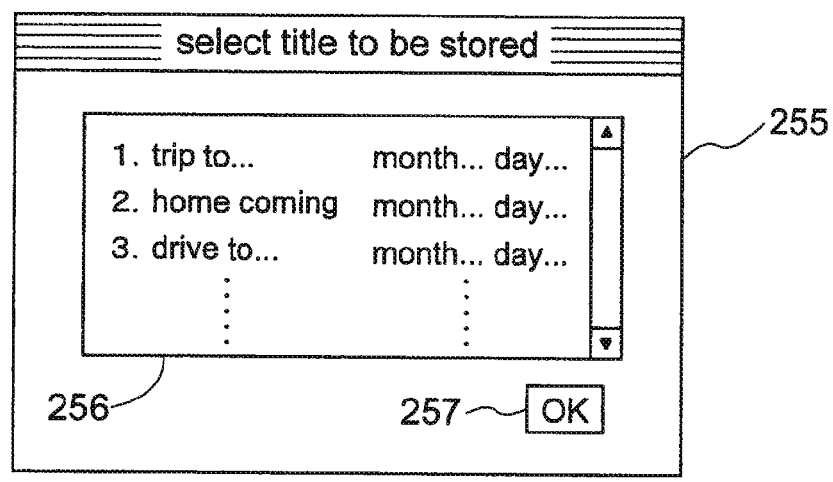
FIG. 32 is a view showing a selecting screen which is displayed in the storing operation relating to the third embodiment.
Figure 33:
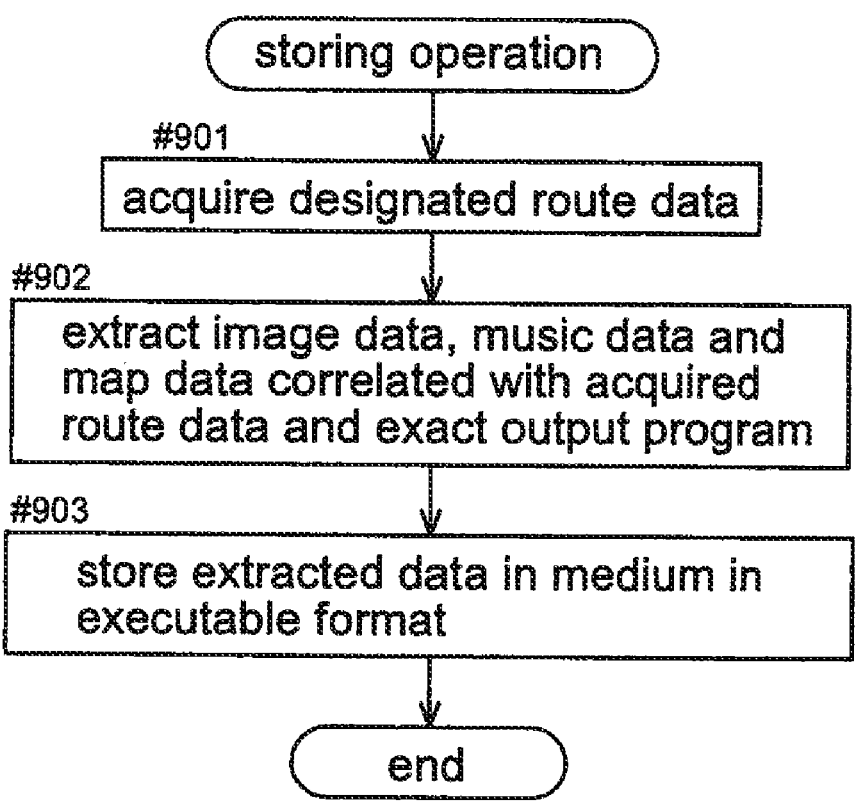
FIG. 33 is a flowchart illustrating a storing operation relating to the third embodiment.

Namely, with the above, there is displayed a selecting screen 255 shown in FIG. 32, so that the user can select one to be reproduced from the titles displayed in a list in the displaying section 256 of the selecting screen 255 and by operating an "OK" button 257, route data R corresponding to that title is designated as shown in the flowchart of FIG. 33 (step #901).

Next, the system obtains the designated route data R and extracts image data and music data correlated with this route data R and map data corresponding thereto and executes an operation for storing these data and an outputting program constituting the outputting means 216 into the disc medium Md (steps #902, #903).

In this way, when the disc medium Md storing the necessary data therein is set to the personal computer, the above-described replay screen will be displayed on the display unit C. Then, by effecting the same operations as described above, the plurality of image data can be displayed for each destination as a simulation on the computer.

As described hereinbefore, according to the present invention, the system employs the hardware for acquiring image data as addition to the conventional navigation system and utilizes the storage means (the image storing means 213) such as the hard disc HD and includes the route storing means 214, the link data generating means 215, the outputting means 216, the storage processing means 217 which can be realized as software.

With the above-described construction, it is possible to sort the image data obtained by a digital camera Cam in a group and to correlate a plurality of image data sorted in a group for each destination P set on the route data of the route traveled by the vehicle. Then, after this correlation, if the actual traveling mode is selected, when the traveling vehicle approaches the previously visited destination P, the plurality of image data can be displayed automatically on the display unit C of the system, thereby to provide the user with vivid recalling of the previous visit. Also, when the replay mode is selected, while the vehicle not traveling, the plurality of image data correlated on the route data R can be displayed at desired timing on the display unit C, so that the user can enjoy the image data just like enjoying a photo album.

In particular, if the storage processing means 217 has stored the route data R, the image data and the outputting means 216 as the outputting program for playing back these data, in e.g. the disc medium Md, by just setting this medium Md to a standard personal computer, the plurality of image data set on the route data R can be displayed as desired while confirming the traveling of the vehicle on the map data in the route data R, so that the user can enjoy the image data as a so-called electronic album.

Other Embodiments Relating to the Third Embodiment

The third embodiment described above can be modified as follows.

(a) If a user took photos with a digital camera Cam when re-visiting a destination P once visited before, the processing mode of the system can be adapted such that the photographic image data are stored as addition to the previously set destination or the photographic image data obtained previously are stored as addition to the destination P on the route of the re-visiting occasion. When such operation mode is to be effected, this can be realized only by changing the mode of operation effected by the link generating means 15 for data correlation. When the photographic image data is to be reproduced, this can be done such that the user can enjoy the previous photographic image data and the new photographic image data in combination.

(b) In the foregoing embodiment, when the display unit C displays the photographic image data, the image data are displayed with the map data as the background. Instead, by changing the output mode of the outputting means 216, the display unit C can display the photographic image data on the entire screen thereof. With employment of such display mode, the user can readily enjoy the large image data.

(c) In the third embodiment, the system adopts the method wherein the image data are stored in correlation with each group corresponding to the destination displayed in the link editing screen. The invention is not limited thereto. Instead, needless to say, the image data can be correlated with using a registered sightseeing place name or a sightseeing map as an index of the group, so that a plurality of image data can be extracted in response to a designation of a sightseeing place on the map of the car navigation. Further, the system can be configured also such that even when no sightseeing place name or sightseeing map is present on the route, by designating any desired position on the mute by the keyboard, this freely designated position may be stored as an index.

(d) In the third embodiment, the position acquiring means employs signals from a GPS satellite. Instead, like the position acquiring method realized in e.g. the PHS type mobile phone, this position acquiring means can be configured for receiving radio waves from a plurality of wave transmitting stations disposed on the ground surface and acquiring the position of the vehicle using these transmitting stations as reference.

(e) In the third embodiment, the navigation system can be a voice navigation system for navigating with a human voice alone, not using any visual display. And, in such modified system not using display, it is contemplated that the route is designated with a voice. In particular, even in the case of such system not using any visual display for navigation, a display unit will be still needed for displaying image data. Further, when route data is to be extracted for correlation of the image data after traveling of the vehicle, the route data can be extracted from the second storing means in response to an input of the date (time) of the travel.

(f) In the third embodiment, as route data not traveled by the vehicle, it is possible to freely generate route data in the form of a straight line connecting to the destination by the shortest distance or combination of straight lines and curved lines. Then, a destination is set for such route data and image data are correlated with that destination. Thereafter, a simulation is effected in the manner that vehicle symbol is caused to travel on the route data, so that the image data included in the group of the destination reached by the vehicle may be displayed on the display unit.

In particular, the destination can be any freely chosen location. And, in case the route data are generated and a destination is set in the above manners, there can be realized a simple display mode wherein only the route data is displayed on the display unit without the map data being displayed and each time the vehicle symbol shown on the route data reaches the destination, the image data included in the group of that destination are displayed.

Fourth Embodiment

The fourth embodiment relates to an image storing apparatus as another example of the image processing apparatus.

Figure 34:
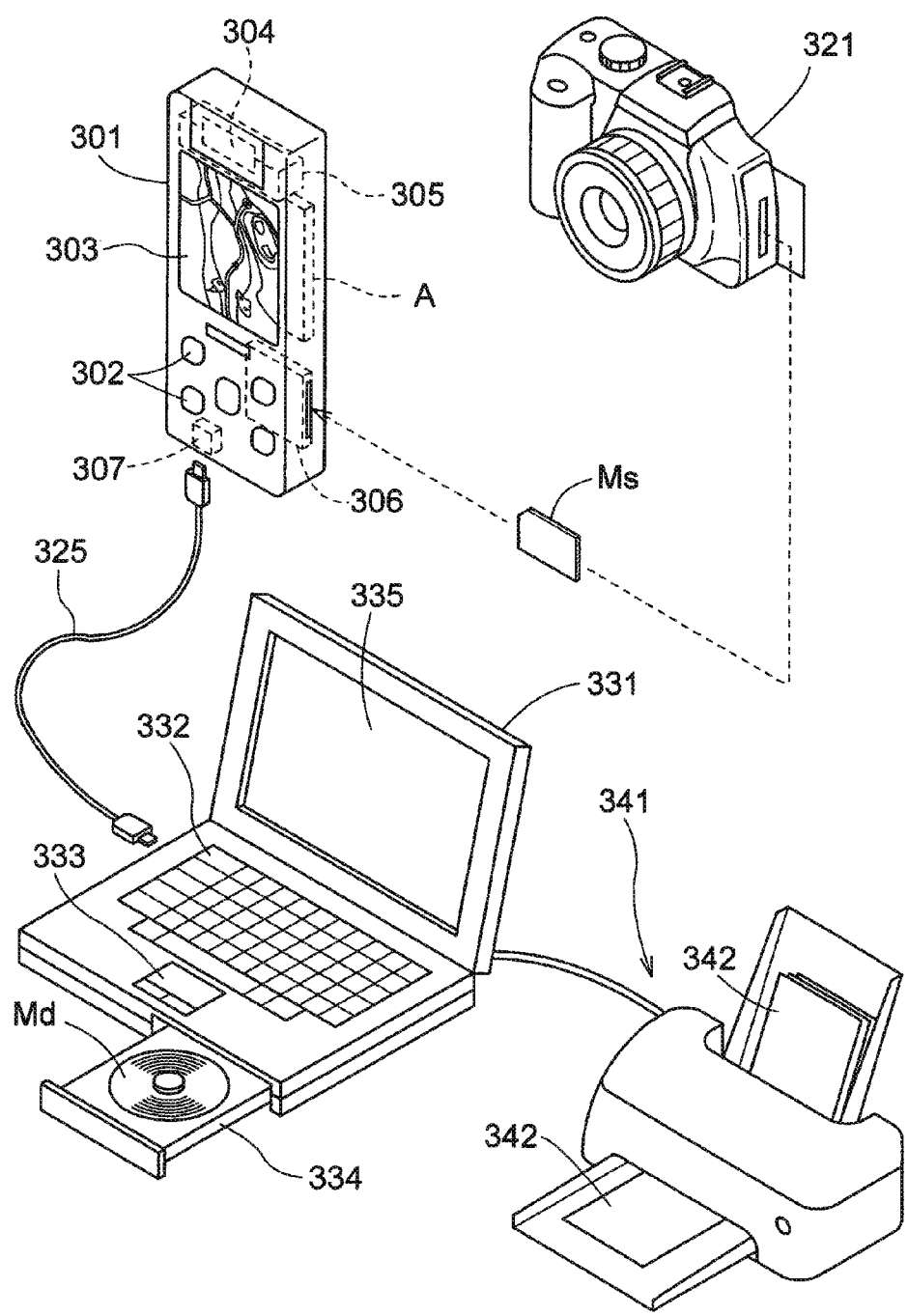
FIG. 34 is a perspective view showing e.g. a digital camera associated with an image storage apparatus relating to a fourth embodiment.

This image storing apparatus has a construction shown in FIG. 34. Namely, a portable-sized apparatus body 301 includes, on the front face thereof, a plurality of operation switches 302 and a liquid crystal display section 303 (an example of displaying section). Further, the apparatus body 301 accommodates therein an antenna section 304 for receiving radio wave from a GPS satellite, a position acquiring means 305 comprising a GPS unit for acquiring position data from the waves received by the antenna section 304, a semiconductor drive 306 acting as an image data acquiring section for acquiring image data stored in a semiconductor medium Ms, and a processing unit D for processing data. Also, on the outer face of the apparatus body 301, there is provided an output terminal 307 acting as an outputting section for outputting data.

This image storing apparatus has the function of displaying, on the liquid crystal display section 303, map data corresponding to the position data acquired by the position acquiring means 305 and displaying at the same time the current position of this apparatus on the map data.

Further, with this image storing apparatus, the position acquiring means 305 continuously acquires the position data. When the semiconductor medium Ms such as a flash memory, storing image data obtained by a digital camera 321 is set to the semiconductor memory 306, the apparatus automatically acquires the image data stored in that storage medium Ms and correlates these image data with the position data. Then, in response to a predetermined operation, the liquid crystal display section 303 displays map data, a route traveled by the apparatus on that map data and displays also image data for each photographic point on the route.

Moreover, with this image storing apparatus, by connecting the output terminal 307 with an input terminal (not shown) of a personal computer 331 via a cable 325 designed under the USP (Universal Serial Bus) or IEEE1394 standard and then effecting predetermined operations, the position data, the image data, link data, the map data and a simulation program can be transferred from the output terminal 307 to the personal computer 331.

Incidentally, when image data obtained by the digital camera 321 are to be stored in this image storing apparatus, instead of using the semiconductor medium Ms described above, the image data can be transferred by connection using the cable designed under the USB or IEEE1384 standard or using the wireless communication technique such as Bluetooth (wireless communication technique proposed by corporations such as IBM, Intel, Nokia, Toshiba Corp.) And, when these techniques are employed, the means used by such techniques for image data transfer will constitute the "image data acquiring means" of the present invention.

As shown in FIG. 34, the personal computer 331 has a conventional system construction, including a body having a keyboard 332, a track pad 333 and a disc drive 334, and a liquid crystal display unit 335.

Further, when the position data, the image data, the link data, the map data and the simulation program are transferred to this personal computer 331 as described above, the computer executes a simulation program, so that the display unit 335 of the personal computer 331 displays the map data and also a route moved by this image storing apparatus in superposition on this map data. Further, in this display, a simulated image of apparatus will be shown as moving thereon. And, each time this apparatus symbol reaches a photographic point, the image data obtained at that photographic point will be displayed automatically. Also, if needed, a user can designate image data shown on the display unit 335 and causes a printer 341 to print the image on a print paper 42. Further, the apparatus can store the position data, the image data, the link data, the map data and the simulation program in the storage medium Md such as a DVD-R set to the disc drive 334.

Figure 35:
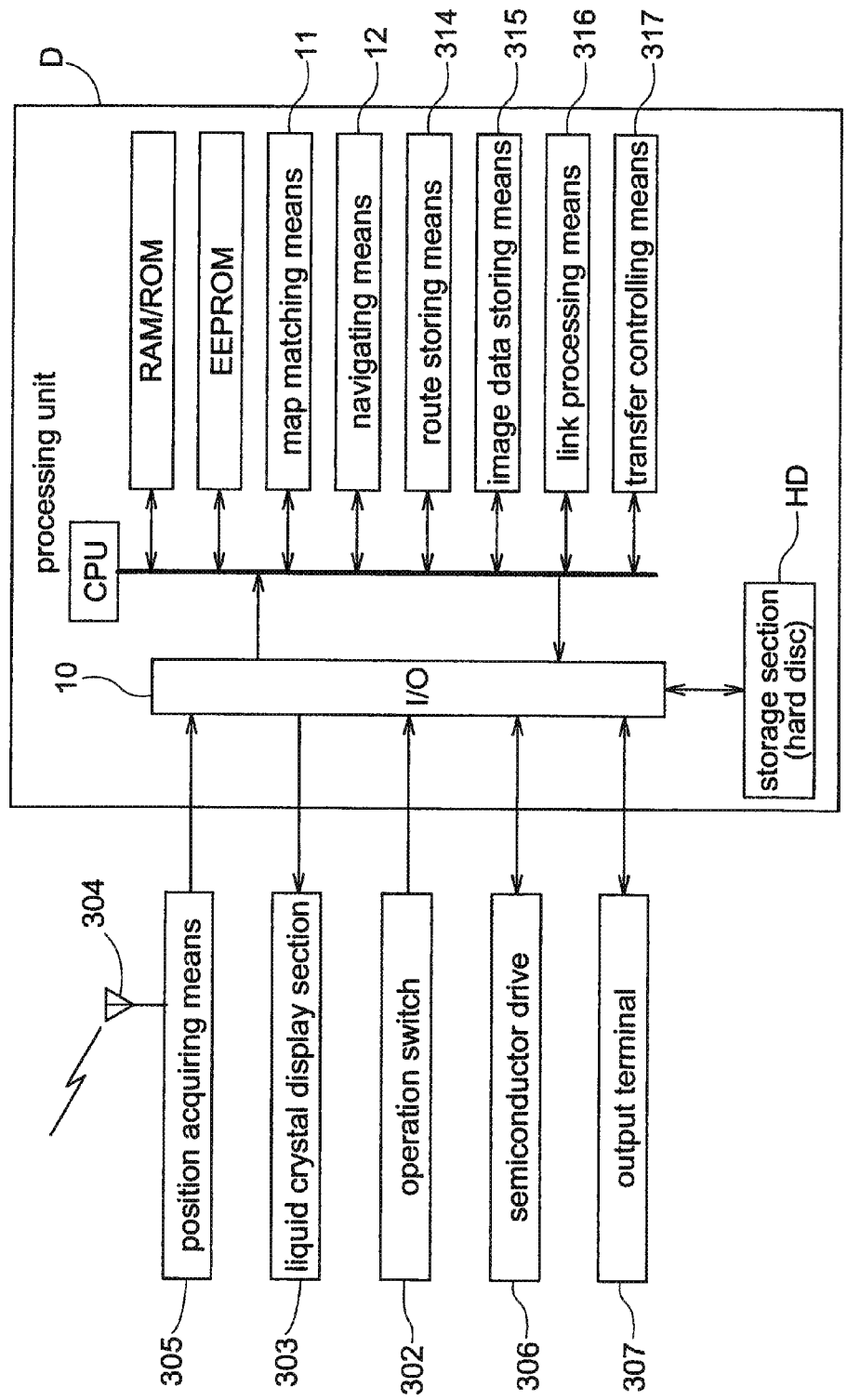
FIG. 35 is a circuit block diagram of the image storage apparatus relating to the fourth embodiment.

FIG. 35 is a block diagram showing an exemplary construction of this image storing apparatus. As shown, the processing unit D includes an input/output interface 10 for realizing access of information to a microprocessor (CPU). To this input/output interface 10, there is provided a signal system for allowing data access from position acquiring means 305, the liquid crystal display section 303, the operation switches 302, the semiconductor drive 303, the output terminal 307 and a hard disc HD (an example of "data storing section", "map data storing section"), respectively.

The processing unit D includes the following components connected to the data bus from the microprocessor, i.e. a semiconductor memory RAM/ROM, a nonvolatile memory EEPROM, a map matching means 11, a navigating means 12, a route storing means 314, an image data storing means 315, a link processing means 316, and a transfer controlling means 317.

Incidentally, in order to realize various control operations in this processing unit D, in addition to the data bus, control buses, address busses, etc are also needed. In order to avoid complexity of the illustration, in the figure, such control busses, address busses, or interfaces, etc. are not illustrated.

The position acquiring means 305 is operable to acquire an electromagnetic wave received by the antenna section 304 from a GPS satellite and also to acquire image storing apparatus position data (longitude and latitude data) by inputting the signals from the GPS satellite in realtime, as well as a time of acquisition of this position data timing data. This position acquiring means 305 can acquire position information from radio waves form a plurality of wave transmitting sources on the ground. By using a radio wave from a wave transmitting source on the ground in combination, the precision of the position information can be enhanced.

The hard disc HD operates to store the plurality of position data acquired by the position acquiring means 305 in a folder for position data, stores map data in a plurality of enlargement scales in a folder for map data, stores a plurality of image data in folders for image data, and stores a plurality of link data in folders for link data. Incidentally, the folder for map data is used for storing preset map data and is used as a database.

Figure 41:
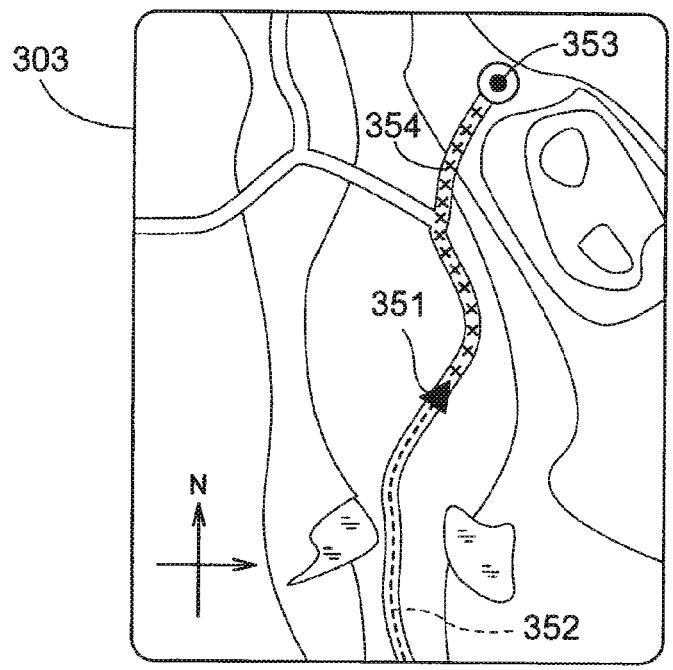
FIG. 41 is a view showing a navigation screen relating to the fourth embodiment.

The map matching means 11 is configured for extracting map data corresponding to the position data acquired by the position acquiring means 305 from the hard disc HD and then causing the liquid crystal display section 303 to display the map data of a predetermined enlargement scale of the extracted map data. Further, on this map data, as shown in FIG. 41, the present position of the image storing apparatus is displayed in the faun of a symbol 351 and the route 352 traveled by this symbol 351 is also displayed on the map.

As shown in the same figure, the navigating means 12 is configured for providing the position data acquired continuously at the predetermined interval by the position acquiring means 305 to the map matching means 11 in the form of data interconnected like a line and also for storing this route data in the hard disc HD.

Figure 42:
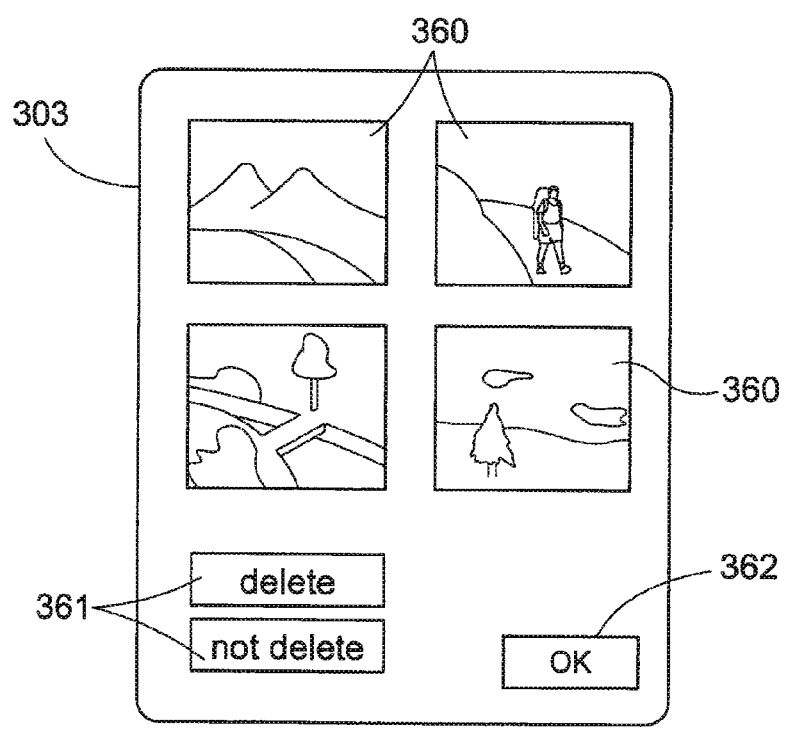
FIG. 42 is a view showing an image selecting screen relating to the fourth embodiment.

The image data storing means 315 is provided for effecting an operation of storing image data acquired via the semiconductor drive 306 in the hard disc HD. After a plurality of image data are stored in the hard disc HD, an image selecting screen shown in FIG. 42 is displayed on the liquid crystal display section 303. And, from a list of image data shown in this screen, an operator can select one for its deletion.

The link processing means 316 automatically generates link data for comparing timing data for specifying the timing of the acquisition of the position data with photographic date data from Exif data annexed to the photographic image data and correlating the former with the latter which agree with or are similar to each other.

The Exif data is annexed to the photographic image data obtained by the digital camera 21. FIG. 9 shows an exemplary construction of this data. Main information included in this Exif data stores therein the name of the manufacturer and the product name of the digital camera and auxiliary information also included therein stores not only data of an exposure time, an image width and height, but also an actual photographic date in the unit of year, month, date, hour and minute. So that, the link processing means 316 acquires the actual photographic data as the photographic date data and acquires the timing data stored in the hard disc HD together with the position data and then effects the comparing operation described above.

The transfer controlling means 317 is configured for transferring the position data, the image data, the link data, the map data corresponding to the position data and the simulation program to the personal computer 331.

Also, in the image storing apparatus of this embodiment, it is contemplated that the map matching means 11, the navigating means 12, the route storing means 314, the image data storing means 315, the link processing means 316 and the transfer controlling means 317 are realized in the form of software (programs) which can be stored in the semiconductor memory RAM. Instead, some or all of these can be realized as hardware such as a wired-logic.

Figure 36:
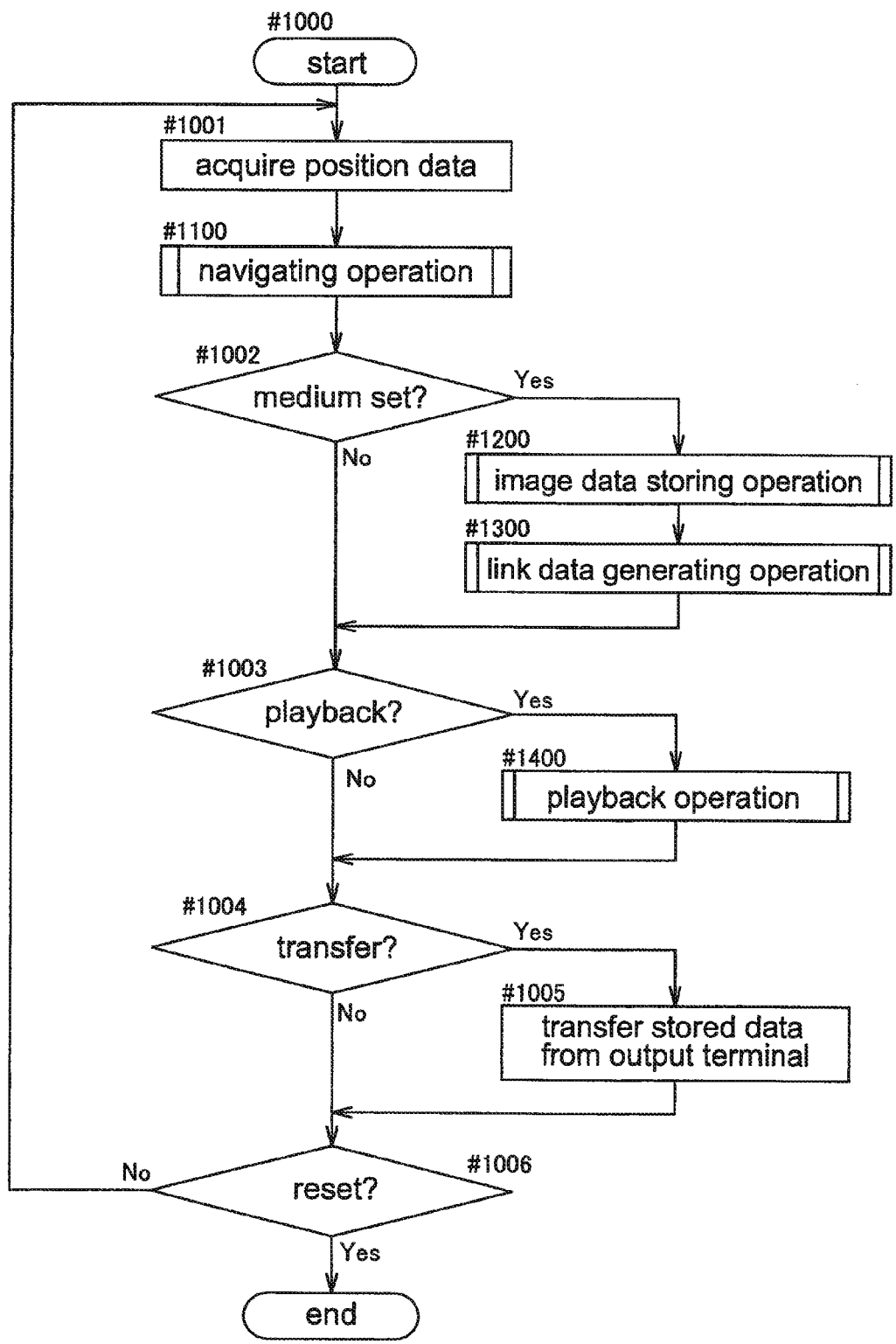
FIG. 36 is a flowchart illustrating a basic control scheme of the image processing apparatus relating to the fourth embodiment.

The control scheme of the processing unit D can be as illustrated in the flowchart of FIG. 36. That is, the position acquiring means 5 acquires the position data at the predetermined interval and executes an image data acquiring routine for acquiring photographic image data at any timing and effects a navigation operation (steps #1001, #1100). The operation at step #1001 corresponds to the position data storing operation of the processing unit D.

Next, when it is found that the storage medium Ms is set to the semiconductor drive 306 (YES at step #1002), the apparatus reads out the image data stored in that storage medium Ms and effects a storing operation for storing new image data in the hard disc HD (step #1200). Further, the apparatus effects a link data generating operation for storing the newly stored image data and the position data in correlation with each other (step #1300).

Further, if a playback operation is selected by an operation on an operation switch 302 of the image storing apparatus (YES at step #1003), the apparatus effects a playback operation for displaying the stored image data on the liquid crystal display section 303 (step #1400).

Also, if a transferring operation is selected by an operation on the operation switch 302 of the image storing apparatus (YES at step #1004), the apparatus effects a transferring operation for storing the data stored in the hard disc HD to the personal computer 31 through the output terminal 7 (step #1005, the "outputting operation"). And, these operations will be continued until being reset (step #1006).

The navigating operation (step #1100), the image data storing operation (step #1200), the link data generating operation (step #1300) and the playback operation (step #1400) are set respectively in the form of subroutines. The modes of these operations will be described next.

Figure 37:
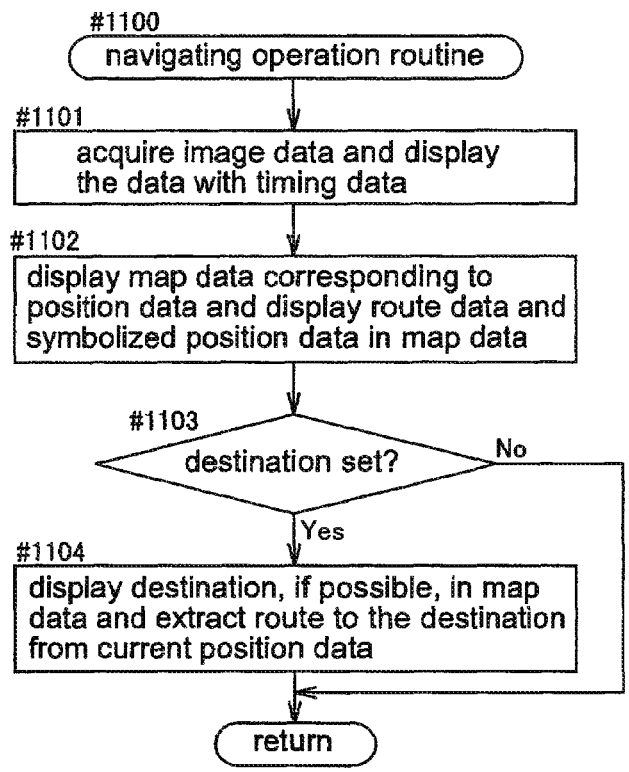
FIG. 37 is a flowchart illustrating a navigation operation routine relating to the fourth embodiment.

In the navigating routine (step #1100), as illustrated by the flowchart of FIG. 37, the position data (latitude data and longitude data) from the position acquiring means 305 are continuously acquired by the predetermined interval (the position data acquiring operation) and these data are stored, together with the acquired timing data (data indicative of time or date), in the hard disc HD (step #1101). This operation for acquiring and storing a plurality of position data is the operation by the route storing means 314.

Also, when the position data have been acquired from the position acquiring means 305, these position data are given to the map matching means 11 and this map matching means 11 extracts, from the hard disc HD, map data corresponding to the position data. And, as shown in FIG. 41, in the navigation screen displayed on the liquid crystal display section 303, the map data is displayed and on this map data, a point of the presence of the position data (i.e. the current position of the image storing apparatus) is displayed as a symbol (icon) 351 of this image storing apparatus and the traveled route 352 (i.e. the route along which the symbol 351 has moved) is displayed on this map data (step #1102).

Next, if a destination 353 has been set, as shown in FIG. 41, the position data (latitude data and longitude data) of this destination 353 is given to the navigating means 12, then, the navigating means 12 displays this destination 353 with the symbol 351 if this can be displayed in the map data being displayed on the liquid crystal display section 303 and also the apparatus extracts a route from the symbol 351 indicating the current position of the image storing apparatus to the destination 353 and displays such route 354 on the map data (steps #1103, #1104).

Figure 38:
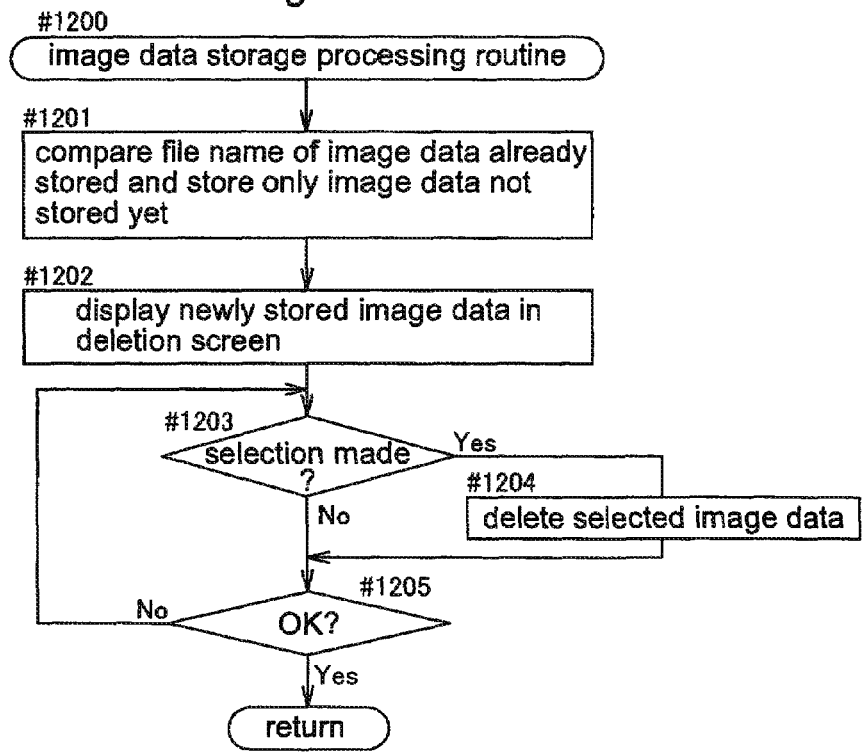
FIG. 38 is a flowchart illustrating an image data storing routine relating to the fourth embodiment.

In the image data storing routine (step #1200), as illustrated by the flowchart of FIG. 38, when the storage medium Ms has been set to the semiconductor drive 306, the file names of the image data stored already in the hard disc HD and the file name of the storage medium Ms are compared and only such image data not yet stored in the hard disc HD will be extracted and then stored in the hard disc HD.

In case new image data has been stored as described above, as shown in FIG. 41, an image selecting screen is displayed on the liquid crystal display section 303 and the newly stored image data are displayed with priority in the form of thumbnail images in the displaying area 360 (steps #1201, #1202). Of these image data displayed in the displaying area 360 of this selecting screen, the operator can select any image data which is judged as unnecessary by operating the operation switch 302. Then, with an operation of an operation button 361 in the screen, the selected image data will be set as data to be deleted. Further, after this setting, by operating the OK button 362 in the screen by operating the operation switch 302, the deletion of the selected data can be effected (steps #1203 through #1205).

Figure 39:
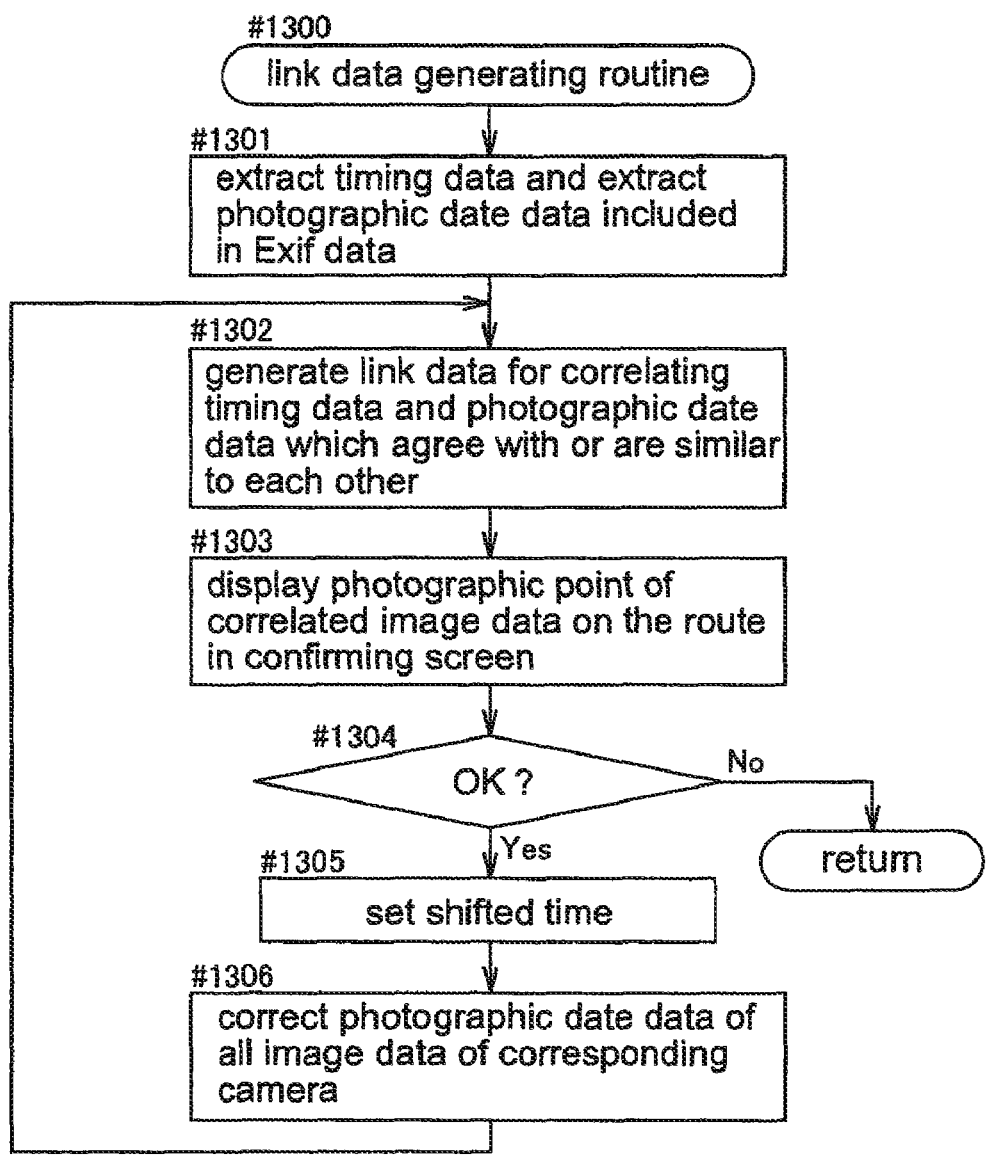
FIG. 39 is a flowchart illustrating a link data generating routine relating to the fourth embodiment.

In the link data generating routine (step #1300: serving also as a link data storing operation), as illustrated by the flowchart of FIG. 39, the link processing means 316 extracts the timing data stored in the hard disc HD and extracts also the photographic date data from Exif data annexed to the photographic image data stored in the hard disc HD and automatically generates link data for correlating those agreeing with or similar to each other of the plurality of the timing data and the plurality of the photographic date data (steps #1301, #1302).

Figure 43:
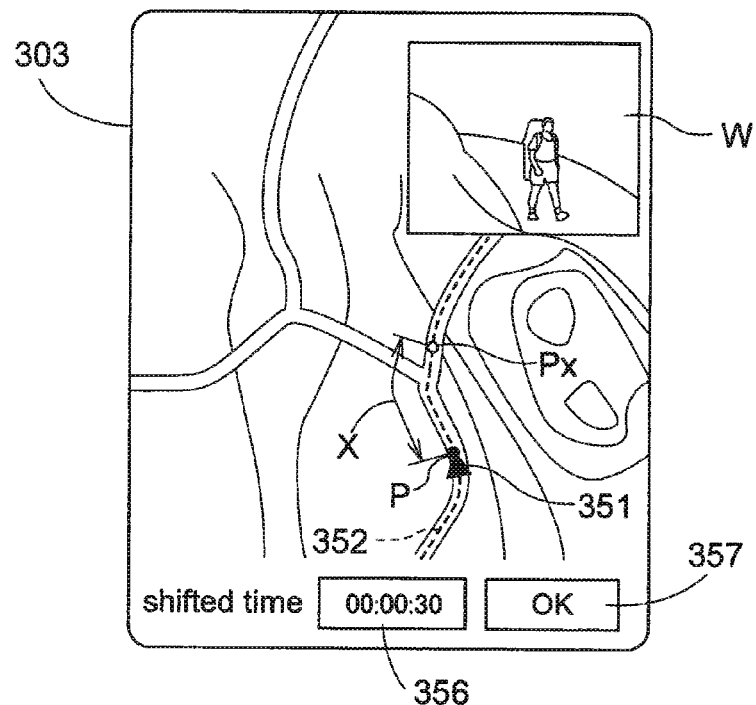
FIG. 43 is a view showing a confirming screen relating to the fourth embodiment.

After the above-described generation of the link data, as shown in FIG. 43, the liquid crystal display section 303 displays a confirming screen in which a route 351 is displayed (to be detailed later) and also on this route 351, the photographic point (agreeing with the symbol 352, the point can be a single point or a plurality of points) is displayed on this route 351 (step #1303).

When the photographic points P are displayed in the manner described above, the user (operator) will judge presence/absence of error relative to the actual photographic positions. Such error is attributable to a time difference which may be present between the timing data generated by the position acquiring means 5 and a clock incorporated in the digital camera 21. If such difference or error is present, then, the user will effect an operation for correcting the photographic date data. With this, the photographic date data of all the photographic image data obtained by the digital camera 21 will be corrected at one time (steps #1304 through #1306). And, link data will be generated again, and the photographic point P is displayed on the route 351 for requesting the user's confirmation and if it is found that the error has been corrected, then, the process is completed.

Namely, at step #1300, the confirming screen 40 shown in FIG. 43 is displayed on the display unit C. In this confirming screen, there are displayed the map data, the route 352 on the map data, the photographic points P as "link positions" and the photographic image data correlated with the photographic points P via the link data in the displaying area W. Further, under the above-described display condition, if the operator finds that the actual photographic point Px where that photographic image data was obtained is offset by a distance X. Then, the operator will operates the operation switch 302 for shifting the photographic point P on the route 110 to agree with the actual photographic point Px.

When the photographic point P has been shifted as described above, a time period corresponding to the amount of this shifting of the photographic point P is displaced as a numeric value at the displaying section 356. With this, the photographic times of the plurality of image data are shifted at one time by the shifted time.

In effecting the above operation, it is preferred that the operator effect it based on image data whose photographic point the operator remembers well. In the link data generating routine (step #1300), the operator can also freely select image data to be displayed in the displaying area W by operating the operation switch 202. Further, in order to appropriately grasp the positional relationship between the photographic point P and the actual photographic point Px, it is possible to display the map data in an enlarged scale.

Further, though not detailed, this image storing apparatus is capable also of acquiring and processing photographic image data obtained by a plurality of digital cameras 321. When a plurality of digital cameras 321 are employed, the apparatus can identify each digital camera based on the name of the manufacturer and type of the camera included in the Exif data, so that the apparatus can effect the operation for correcting the positional relationship between the photographic point P and the actual photographic point Px for each individual camera.

Incidentally, in the case of the operation illustrated in the flowchart of FIG. 39, in order to correct an error, the operator confirms the photographic point P and the actual photographic point Px on the map. Instead, the apparatus can be adapted for allowing the shifted time to be inputted manually as a numerical value. Incidentally, the link data has a simple data construction in which the position data (latitude and longitude data) are recorded in correlation with the file number of the photographic image data.

Figure 40:
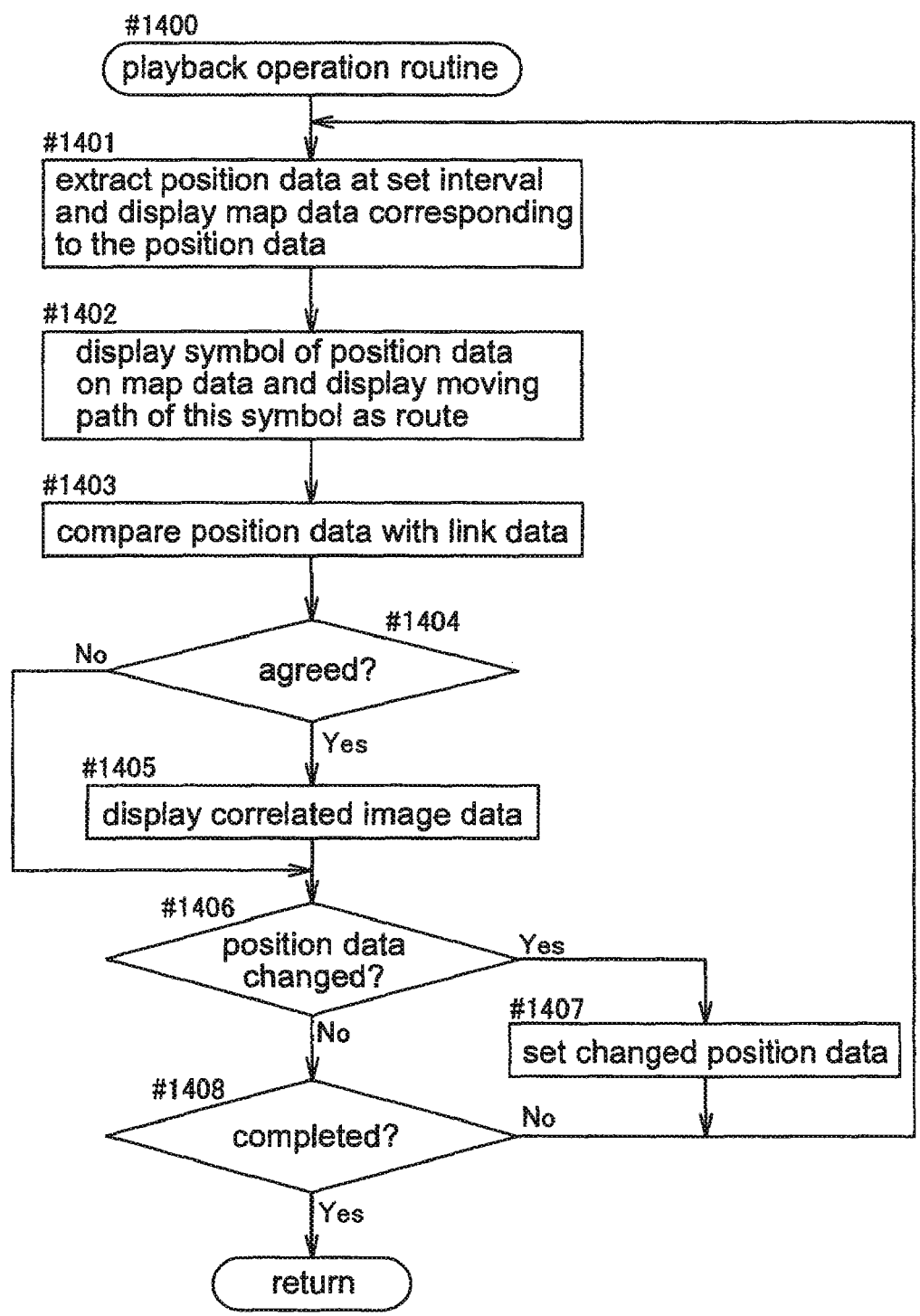
FIG. 40 is a flowchart illustrating a playback operation routine relating to the fourth embodiment.
Figure 44:
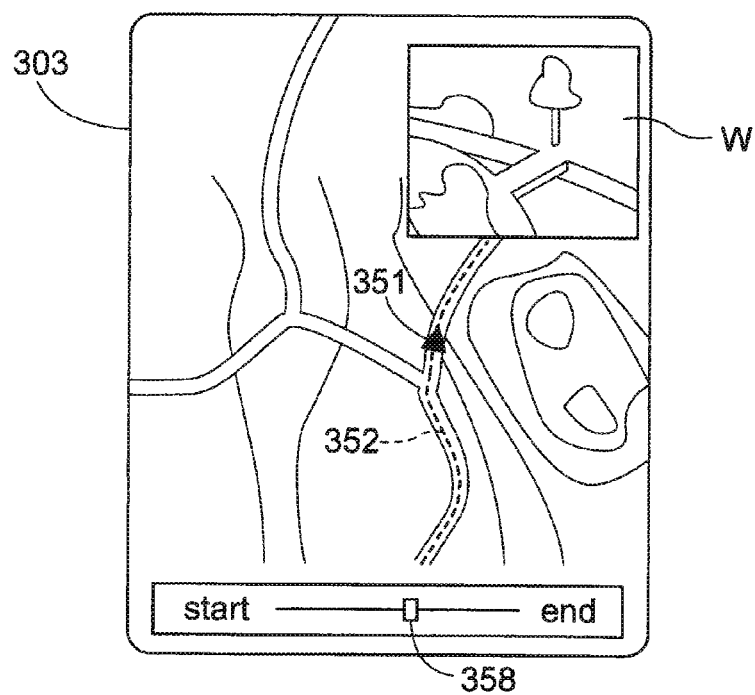
FIG. 44 is a view showing a playback screen relating to the fourth embodiment.

The above-described playback operation (step #1400) is effected as illustrated by the flowchart of FIG. 40, with the liquid crystal display section 303 displaying the playback screen shown in FIG. 44. Upon start of this operation, the position data stored in the hard disc HD are extracted by the predetermined interval and map data corresponding to the extracted position data are displayed in the playback screen. And, on the map data, the symbol 351 of the position data corresponding to the initial position is displayed and the route 352 extracted from the route storing means 314 is displayed on the map data. Then, the symbol 351 is moved along this route 352 (steps #1401, #1402).

Further, each time the position data is revised, this revised position data is compared with the link data. Then if there exists link data agreeing with the position data, the image data correlated via this link data is extracted from the hard disc HD and displayed in the displaying area W (steps #1404, #1405).

In this playback screen, there is displayed an indicator 358 for indicating the displaying condition on a time line. When this indicator 358 is operated by an operation of the operation switch 302, the position data is changed and then a playback based on this changed position data is started (steps #1406, #1407) and these operations are continued until their completions (step #1408).

That is to say, this playback operation (step #1400) is execution of the above-described simulation program. In the playback screen, the symbol 351 corresponding to the most initial position data and the map data corresponding thereto are displayed. And, the plurality of position data stored in the hard disc HD are read out at the predetermined interval according to the order of the storage of these position data. And, the position data thus retrieved are revised, so that the symbol 351 is displayed as being moving on the map data. And, when this symbol 351 reaches the photographic point (i.e. if there is link data agreeing with that position data), the image data correlated with that photographic position (position data) are extracted from the hard disc HD and displayed in the displaying area W.

Further, when the symbol 351 is displayed as being moving on the map data, the indicator 358 is moved along the time base, so that the indicator 358 is displayed at a position reflecting the time lapse. And, if the indicator 358 is moved by a desired operation of the operation switch 302, the playback operation is resumed at the position indicated by that indicator 302.

In the playback screen shown in FIG. 44, the route 52 is displayed in advance. However, it is not absolutely needed to display this route 352. Rather, the route 352 can be displayed only at the area of the moving of the symbol 351.

At the step #1005, the position data folder storing the plurality of position data, the image data folder storing the image data, the link data folder storing the plurality of link data, and the simulation program are extracted respectively from the hard disc HD. And, the map data corresponding to the plurality of position data (agreeing with the route data) are extracted from the map database and stored to generate the map data folder. And, this map data folder, the position data folder, the image data folder, the link data folder, and the playback program are transferred respectively to the personal computer 331.

Also, the mode of the operation may be adapted such that music is played as BGM during the execution of the simulation program. And, this music program can be stored in advance in the personal computer 325 or can be acquired from a music CD set to the disc drive 334 or acquired via the Internet.

And, after the data have been transferred to the personal computer 331, with the execution of the simulation program, a screen similar to the playback screen at the playback routine (step #1400) is displayed on the display unit 335 of the personal computer 331, whereby the playback operation is effected with displaying the image data obtained at that photographic point in the displaying area W while displaying the symbol 351 corresponding to that photographic point on the map data.

Especially, during the above-described execution of the simulation program, it is effective to play music as BGM. Further, by a printing program pre-installed in the personal computer 331, image data may be freely designated from the image data stored in the image folder to be printed on a print paper 342 by a printer 341.

Also, with this personal computer 331, the map data folder, the position data folder, the image data folder, the link data folder and the playback program acquired by the operation at step #1005 may be stored respectively in the storage medium Md such as a DVD-R, CR-R, etc. by the disc drive 334.

Then, by setting the storage medium Md storing the data as described above to another personal computer and executing the playback program thereon, the playback operation may be effected with displaying the image data obtained at that photographic point in the displaying area W while displaying the symbol 351 corresponding to that photographic point on the map data.

As described above, by carrying the image storage apparatus of the invention to a trip or trekking and displaying its navigation screen, the user can grasp his/her current position as well as the route 352 covered from the symbol being displayed in that screen.

Further, when landscape photos or snap photos are taken by the digital camera 321, simply by setting the storage medium Ms storing the image data at a desired timing to the semiconductor drive 306, the user can store each image data in the hard disc HD while confirming whether each of the plurality of image data stored in that storage medium Md is needed or not. And, after this storage, based on the photographic date data of the stored image data and the timing data of the position data, each image data is automatically correlated with the photographic point.

And, after the storage of the image data, in response to selection of the playback operation, the playback screen is displayed in the liquid crystal display section 303. In this screen, the map data and the route 352 are displayed and also the symbol 351 (position data) is moved along this route. Then, each time this moving symbol 351 reaches a photographic point, the image data obtained at that photographic point P are displayed in the displaying area W, so that the user can confirm the photographic point and the image data in correlation with each other. That is, the image data can be displayed with display of its photographic point.

Also, as this image storage apparatus uses the hard disc HD, the apparatus is less costly than a flash memory, but has a greater storage capacity. Hence, even when the amount of image data has reached the maximum storage capacity of the storage medium Ms used in the digital camera 321, by storing the image data in the image storage apparatus of the invention, all the image data in the storage medium Ms can then be deleted, so that the digital camera becomes ready for taking new photos.

Further, after the storage of the image data in the image storage apparatus of the invention, by transferring this image data and the correlated data to the personal computer 331, on this personal computer 331, the image data can be displayed together with the map data etc. on its liquid crystal display section 303, just like the playback operation effected in the image storage apparatus.

And, by storing such data which can be played back in the storage medium Md such as a DVD-R, this storage medium Md can be handled just like an electronic album. Hence, by setting this storage medium Md to the personal computer 331, the image data can be displayed on its display unit, with the moving symbol 351 indirectly indicating the photographic point.

Other Embodiments Relating to Fourth Embodiment

The fourth embodiment described above may be modified as follows.

(a) Instead of the map data, a schematic map such as an illustration or a sightseeing map allowing a user to grasp a geographical position on the position data can be employed. When such illustration or schematic is used, the amount of data can be reduced, compared with the case using the map data. Hence, the useable area in the hard disc HD can be increased. In particular, if a schematic display such as an illustration is employed in the display of the playback screen, the system can be simplified.

(b) In the correlating operation between the position data and the image data, the Exif data is employed in the foregoing embodiment. Instead, the correlating operation may be made between the position data at the timing of the image data acquisition, e.g. the timing of setting of the storage medium Ms storing the image data to the semiconductor drive 306 and the image data stored in that storage medium Ms. Namely, if the operation of storing image data in the image storage apparatus is effected each time a photo is taken by the digital camera 321, there occurs some time error relative to the position data. However, the correlation operation can be effected without any practical problem in case the moving speed is low such as in the case of trekking.

(c) In effecting the playback operation, the position correlated with the image data (agreeing with the photographic point) may be displayed in the form of a dot on the route 352 or the image data may be displayed in the form of thumbnail, so that the user may visually grasp the number of image data present on the route 342 or the position of the photographic point.

(d) In the foregoing discussion of fourth embodiment, the digital camera and the image storage apparatus have been described separately of each other. The invention is not limited thereto. Instead, a portion of the image storage apparatus or this entire image storage apparatus may be incorporated in the digital camera.

I claim:

1. An image processing system comprising:
    an image data acquiring section for acquiring image data obtained by a digital camera;
    a data storing section for storing data;
    a processing unit for storing the image data acquired by the image data acquiring section in the data storing section;
    position acquiring means for acquiring position data; and
    a portable-sized apparatus body including a map data storing section for storing map data indicative of position of the position data acquired by the position acquiring means and an outputting section for outputting the data stored in the data storing section;
    wherein said processing unit is configured to effect a position data storing operation for continuously acquiring the position data by the position acquiring means and storing the data in the data storing section, an image data storing operation for storing the image data acquired by the image data acquiring section in the data storing section, a link data generating operation for generating link data for correlating the position data with the image data, and a link data storing operation for storing the link data in the data storing section; and
    said processing unit is further configured to effect an outputting operation for causing said outputting section to output the position data stored in the data storing section, the map data indicative of the position of the position data and the image data correlated with the position data.

2. The image processing system according to claim 1, wherein further comprising link processing means for effecting the generation of the link data, said link processing means being operable to compare timing data for specifying the time of acquisition of the position data with photographic date data annexed to the image data and to generate link data which link timing data and photographic data agreeing with or similar to each other.

3. The image processing system according to claim 1, wherein said apparatus body includes a display unit; and
    said processing unit causes the display unit to display the map data corresponding to the position data and the image data correlated with the position data.

4. The image processing system according to claim 1, wherein said position acquiring means comprises a GPS unit for acquiring the position data by receiving radio waves from a plurality of artificial satellites.

5. The image processing system according to claim 2, wherein said position acquiring means comprises a GPS unit for acquiring the position data by receiving radio waves from a plurality of artificial satellites, said GPS unit storing, together with the position data, a time of the acquisition of the position data as said timing data;
    said link processing means effects said linking operation for linking timing data and photographic data agreeing with or similar to each other, an automatic link mode in which photographic date data included in Exif data annexed to the image data obtained by the digital camera and the timing data agreeing therewith or similar thereto are linked to each other; and
    said link processing means effects also a correction link mode operation in which all photographic date data included in the Exif data annexed to the image data obtained by the digital camera are shifted by a same value and then the shifted photographic date data and the timing data are correlated with each other.

6. The image processing system according to claim 1, wherein said image data acquiring section acquires image data from a storage medium used in the digital camera; and
    if said processing unit determines that the storage medium is set to said image data acquiring section, the unit discriminates the plurality of image data stored in that storage medium and stores in the data storage section only image data excluding the image data stored already in the data storing section.

* * * * *